(12) United States Patent
Lucido et al.

(10) Patent No.: US 7,191,578 B2
(45) Date of Patent: Mar. 20, 2007

(54) PATTERN FORMER FOR WRAPPED BAKERY PRODUCTS AND BAKERY TRAY LOADING SYSTEM

(75) Inventors: John M. Lucido, Garland, TX (US); William A. Rinks, Lavon, TX (US)

(73) Assignee: Stewart Systems, Inc., Plano, TX (US)

( * ) Notice: Subject to any disclaimer, the term of this patent is extended or adjusted under 35 U.S.C. 154(b) by 95 days.

(21) Appl. No.: 11/120,816

(22) Filed: May 3, 2005

(65) Prior Publication Data

US 2006/0042194 A1 Mar. 2, 2006

Related U.S. Application Data

(63) Continuation-in-part of application No. 11/070,649, filed on Mar. 2, 2005, now Pat. No. 7,076,934, which is a continuation of application No. 10/794,443, filed on Mar. 5, 2004, now Pat. No. 6,862,869, which is a continuation-in-part of application No. 10/093,242, filed on Mar. 8, 2002, now Pat. No. 6,766,631, which is a continuation of application No. 09/587,127, filed on Jun. 2, 2000, now Pat. No. 6,401,435.

(60) Provisional application No. 60/159,627, filed on Oct. 14, 1999.

(51) Int. Cl.
  *B65B 35/40* (2006.01)
  *B65B 5/06* (2006.01)

(52) U.S. Cl. .............. 53/448; 53/473; 53/251; 53/252; 53/543

(58) Field of Classification Search .......... 53/448, 53/473, 475, 543, 249–252, 247, 255, 258, 53/259
See application file for complete search history.

(56) References Cited

U.S. PATENT DOCUMENTS

| 2,633,251 | A |   | 3/1953  | Bruce .......................... 53/500 |
|-----------|---|---|---------|----------------------------------------|
| 2,884,114 | A |   | 4/1959  | Oberwelland ............... 198/429     |
| 3,396,507 | A |   | 8/1968  | Morris et al. ................. 53/142  |
| 3,470,674 | A | * | 10/1969 | Madonia ...................... 53/251   |
| 3,490,354 | A |   | 1/1970  | Fehr et al. .................... 53/435 |
| 3,618,288 | A | * | 11/1971 | Thornton et al. ............. 53/251    |
| 3,866,388 | A |   | 2/1975  | Koehler, III ................. 53/500   |
| 4,048,784 | A |   | 9/1977  | Toby ............................. 53/77 |
| 4,333,297 | A |   | 6/1982  | Kuttenbaum et al. ......... 53/252      |
| 4,481,752 | A |   | 11/1984 | Sabel .......................... 53/448 |
| 4,514,957 | A | * | 5/1985  | Langen ........................ 53/252  |
| 4,522,292 | A |   | 6/1985  | Euverard et al. ........... 198/374     |
| 4,534,153 | A | * | 8/1985  | Nowicki ...................... 53/448   |
| 4,699,559 | A | * | 10/1987 | Bibbo et al. ................ 198/428   |
| 4,713,926 | A |   | 12/1987 | Mennie et al. ............... 53/443    |
| 4,714,926 | A |   | 12/1987 | Neuner et al.                           |
| 4,720,958 | A |   | 1/1988  | Wright et al. ................. 53/157  |

(Continued)

*Primary Examiner*—Stephen F. Gerrity
(74) *Attorney, Agent, or Firm*—Michael A. O'Neil

(57) ABSTRACT

A pattern former for assembling wrapped bakery products into predetermined patterns includes a vacuum turntable. A first transfer apparatus moves groups of wrapped bakery products onto the vacuum turntable and a second transfer apparatus moves assembled patterns of wrapped bakery products from the vacuum turntable into bakery trays. A bakery tray loading system receives unfilled bakery trays and sequentially delivers unfilled bakery trays to a bakery tray loading station adjacent to the vacuum turntable. A conveyor assembly within the bakery tray loading station supports the bakery tray while being filled and thereafter conveys the loaded bakery tray onto an out-feed conveyor for further processing.

11 Claims, 49 Drawing Sheets

U.S. PATENT DOCUMENTS

| | | | |
|---|---|---|---|
| 4,856,263 A | 8/1989 | Schneider et al. | 53/543 |
| 5,012,628 A * | 5/1991 | Van Oord | 53/448 |
| 5,265,400 A | 11/1993 | Roberts et al. | 53/500 |
| 5,317,859 A | 6/1994 | Schneider et al. | 53/534 |
| 5,477,663 A | 12/1995 | Smith et al. | 53/475 |
| 5,535,576 A * | 7/1996 | Walintschek | 53/250 |
| 5,535,999 A | 7/1996 | Ford | 271/185 |
| 5,778,640 A * | 7/1998 | Prakken et al. | 53/475 |
| 6,061,996 A | 5/2000 | Vissers et al. | 53/244 |
| 6,094,885 A * | 8/2000 | Ranhotra | 53/473 |
| 6,401,435 B1 | 6/2002 | Kilby et al. | 53/448 |
| 6,578,344 B1 | 6/2003 | Fluck | 53/254 |

* cited by examiner

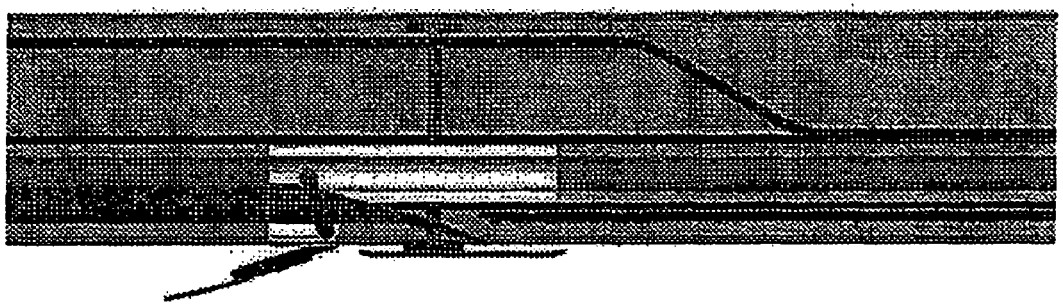
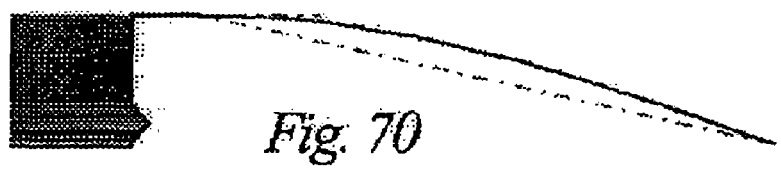
Fig. 70
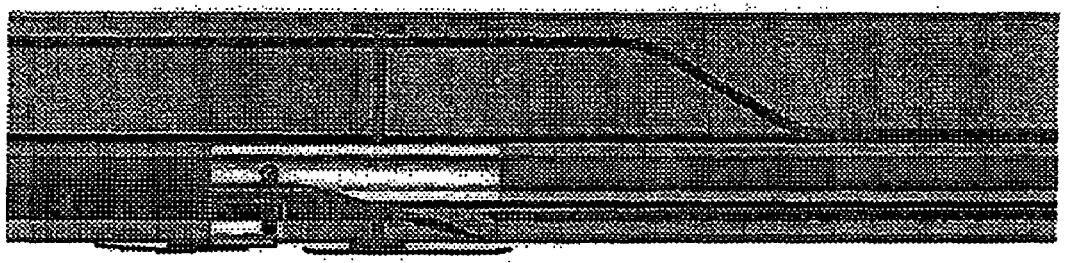
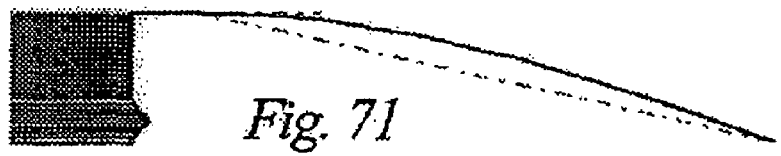
Fig. 71

Fig. 72
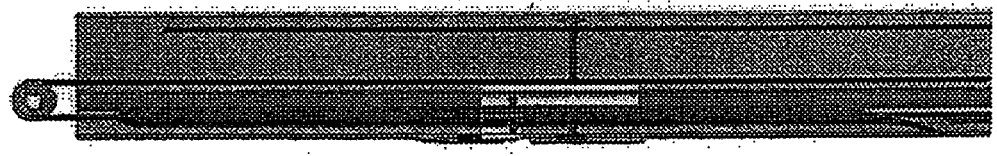
Fig. 73
Fig. 74

PATTERN FORMER FOR WRAPPED BAKERY PRODUCTS AND BAKERY TRAY LOADING SYSTEM

CROSS-REFERENCE TO RELATED APPLICATIONS

This application is a continuation-in-part of application Ser. No. 11/070,649, filed Mar. 2, 2005, now U.S. Pat. No. 7,076,934, which is a continuation of application Ser. No. 10/794,443 filed Mar. 5, 2004, now U.S. Pat. No. 6,862,869, which is a continuation-in-part of application Ser. No. 10/093,242 filed Mar. 8, 2002, now U.S. Pat. No. 6,766,631, which is a continuation of application Ser. No. 09/587,127 filed Jun. 2, 2000, now U.S. Pat. No. 6,401,435, which claims the benefit of application Ser. No. 60/159,627 filed Oct. 14, 1999.

TECHNICAL FIELD

This invention relates generally to pattern formers for bakery products, and more particularly to apparatus for assembling wrapped bakery products into predetermined patterns prior to the loading thereof into bakery trays.

BACKGROUND AND SUMMARY OF THE INVENTION

The operation of a modern commercial bakery in the manufacture of bakery products such as sliced bread loaves begins with the preparation of dough which is deposited into baking pans, proofed, and baked. Thereafter, the baked loaves of bread are removed from the pans, cooled, sliced, wrapped in plastic film, and loaded into bakery trays for delivery to retail outlets.

As is well known, bread and other wrapped bakery products such as hamburger buns, hot dog buns, etc. are available in a seemingly infinite number of sizes. However, commercial bakeries do not typically provide bakery trays which are configured to receive particular bakery products. Rather, commercial bakeries typically employ one type, or at most a few types, of bakery trays which are used to receive and transport a wide variety of bakery products.

Prior to being loaded into bakery trays, bakery products are arranged in predetermined patterns, the purpose being to assure the most efficient loading of a particular tray configuration with a particular bakery product to be received therein. In addition to loading efficiency, the positioning of the tails of the wrapped bakery products, that is, the openable ends thereof which are tied or otherwise secured during transport, is also taken into consideration. Preferably, the tails of the wrapped bakery products face inwardly thereby preventing snagging or tearing during transport.

The apparatus that is used to arrange wrapped bakery products in predetermined patterns prior to the loading thereof into bakery trays is known as a pattern former. Typically, a pattern former receives individually wrapped bakery products from the wrapping apparatus, arranges the received wrapped bakery products in groups comprising between 1 and about 6 wrapped bakery products, assembles at least 2 and as many as several groups of wrapped bakery products relative to one another to form the predetermined pattern, then positions the entire pattern of wrapped bakery products in a bakery tray for transport.

U.S. Pat. No. 4,522,292 granted to Euverard, et al. on Jun. 11, 1985; U.S. Pat. No. 4,856,263 granted to Schneider, et al. on Aug. 15, 1989; and U.S. Pat. No. 5,317,859 granted to Schneider, et al. on Jun. 7, 1994 illustrate and describe prior art pattern formers. The pattern formers of the prior art are relatively complex in design and are therefore costly to purchase and maintain. Perhaps more importantly, prior art pattern formers are relatively slow in operation, achieving the maximum rate of about 60 loaves per minute. This means that several of the prior art pattern formers are required in order to fill bakery trays with wrapped bakery products at a rate that is compatible with the output of a typical bakery product wrapping apparatus.

The present invention comprises an improved pattern former for wrapped bakery products which overcomes the foregoing and other deficiencies which have long since characterized the prior art. In particular, the pattern former of the present invention has an operational speed of 100 loaves per minute which means that a significantly smaller number of pattern formers is required in order to fulfill the pattern forming requirements of the modern commercial baking operation. This results in substantial savings to the bakery operator both in terms of initial cost and in terms of maintenance requirements.

The use of pattern formers incorporating the present invention is also advantageous in that pattern formers constructed in accordance with the invention are adapted to receive wrapped bakery products along the same axis and from the same bakery product inputting devices that have been used to supply pattern formers of the prior art, and to deliver filled bakery trays along the same axis and to the same bakery tray receiving apparatus that has been used with prior art pattern formers. This means that the pattern former of the present invention can be installed in an existing bakery without reconfiguring the bakery and without repositioning the apparatus which deliver wrapped bakery products to and receive filled bakery trays from the pattern former.

More particularly, the pattern former of the present invention employs a vacuum turntable to receive groups of wrapped bakery products and to assemble the groups of wrapped bakery products into patterns. The use of the vacuum turntable of the present invention is advantageous in that by means thereof wrapped bakery products are received and accurately positioned within predetermined patterns without damage either to the bakery products or the wrapping thereof.

The pattern former of the present invention further includes apparatus for transferring groups of wrapped bakery products onto the vacuum turntable while simultaneously assembling a second group of wrapped bakery products. A similar apparatus transfers patterns of wrapped bakery products into bakery trays while a subsequent pattern is simultaneously being formed. A bakery tray loading system sequentially conveys bakery trays to a bakery tray loading station for receiving the patterns of wrapped bakery products. As will be appreciated by those skilled in the art, the ability of the pattern former of the present invention to perform multiple tasks simultaneously significantly increases the throughput rate of the pattern former.

BRIEF DESCRIPTION OF THE DRAWINGS

A more complete understanding of the invention may be had by reference to the following Detailed Description when taken in conjunction with the accompanying Drawings, wherein:

FIG. 70 is an illustration of a subsequent step in the operation of the apparatus shown in FIGS. 5–11;

FIG. 71 is an illustration of a subsequent step in the operation of the apparatus shown in FIGS. 5–11;

FIG. 72 is an illustration of a subsequent step in the operation of the apparatus shown in FIGS. 5–11;

FIG. 73 is an illustration of a subsequent step in the operation of the apparatus shown in FIGS. 5–11;

FIG. 74 is an illustration of a subsequent step in the operation of the apparatus shown in FIGS. 5–11;

DETAILED DESCRIPTION

Figure 1:
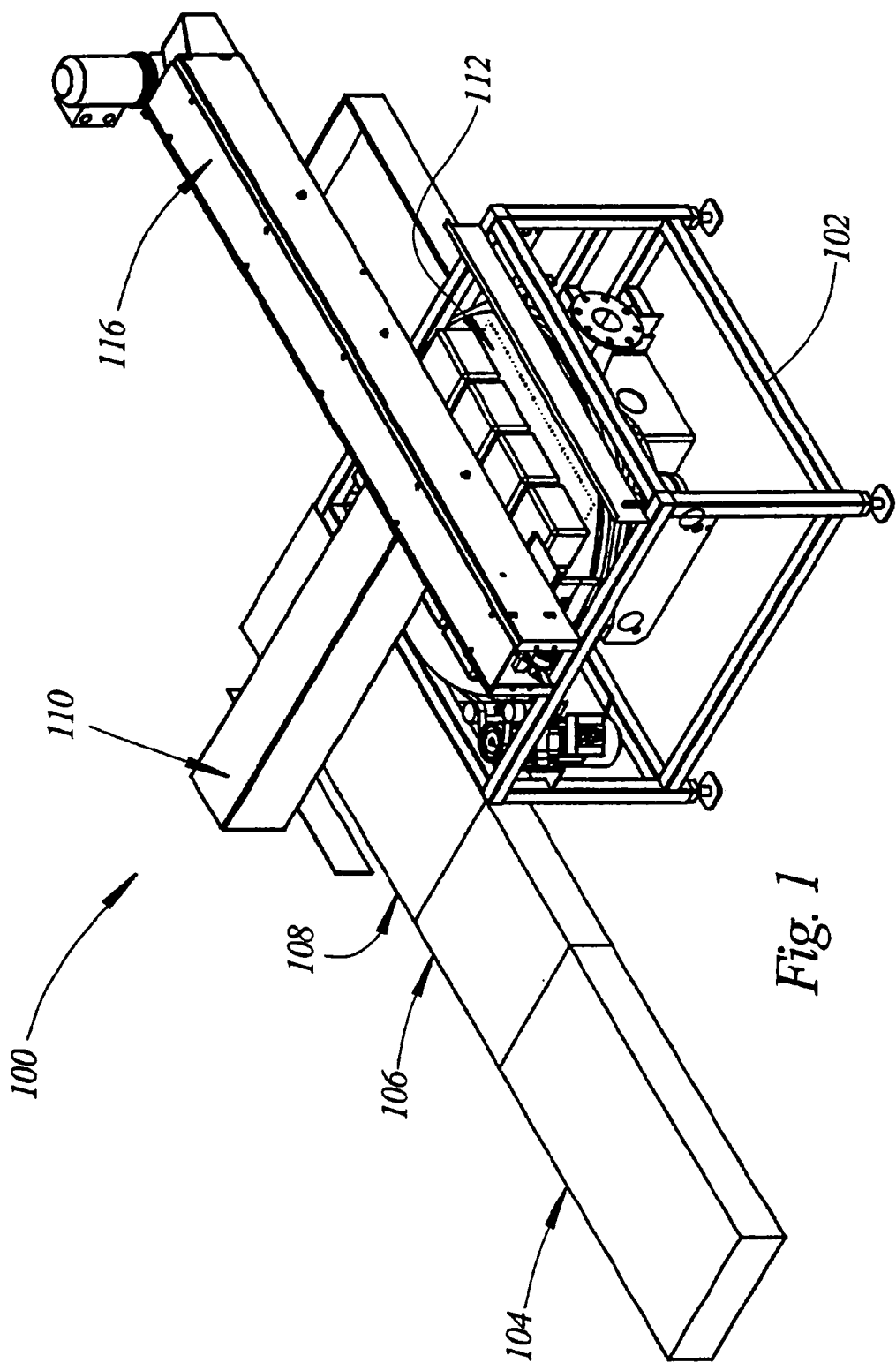
FIG. 1 is a perspective view of a pattern former incorporating the invention.

Referring now to the Drawings, and particularly to FIG. 1, there is shown a pattern former 100 incorporating the present invention. The pattern former 100 includes a frame 102 which supports the various component parts of the pattern former. The frame 102 is conventional in design and may comprise lengths of tubular, channel, or bar stock which are secured together by welding or by means of conventional fasteners.

The pattern former 100 includes an intake conveyor 104 which receives wrapped bakery products from a conventional wrapped bakery product inputting apparatus such as the delivery conveyor of a bakery product wrapping apparatus. A gating conveyor 106 receives wrapped bakery products from the intake conveyor 104 and delivers wrapped bakery products to a grouping apparatus 108. The intake conveyor 104, the gating conveyor 106, and the grouping apparatus 108 function to arrange wrapped bakery products received by the pattern former 100 in groups of wrapped bakery products, each group comprising from between 1 to about 6 wrapped bakery products depending on the particular pattern of wrapped bakery products to be formed.

The pattern former 100 further includes a transfer apparatus 110 which transfers groups of wrapped bakery products from the grouping apparatus 108 onto a vacuum turntable 112. An important feature of the present invention comprises the fact that the transfer apparatus 110 is adapted to transfer a first group of wrapped bakery products to the vacuum turntable 112 while a subsequent group of wrapped bakery products is being arranged on the grouping apparatus 108. The ability of the pattern former 100 of the present invention to perform these two functions simultaneously comprises a significant improvement over the prior art which results in the pattern former of the present invention having a significantly improved throughput rate when compared with prior art pattern formers.

The vacuum turntable 112 functions to receive groups of wrapped bakery products from the transfer apparatus 110 and to assemble the groups of wrapped bakery products into predetermined patterns. After a predetermined pattern of wrapped bakery products is formed, a transfer apparatus 116 transfers the pattern of wrapped bakery products from the vacuum turntable 112 to a bakery tray.

An important feature of the present invention comprises the fact that the transfer apparatus 116 is adapted to transfer a pattern of wrapped bakery products from the vacuum turntable 112 to a bakery tray while a subsequent pattern of wrapped bakery products is being assembled on the turntable 112. The ability of the pattern former 100 of the present invention to perform these two functions simultaneously comprises a significant improvement in that it substantially increases the throughput rate of the pattern former of the present invention when compared with prior art pattern formers.

Vacuum is applied to the vacuum turntable 112 by a vacuum generating apparatus 118 situated beneath the vacuum turntable 112. The vacuum generating apparatus 118 typically comprises a vacuum pump and a manifold connected to the vacuum pump for applying vacuum evenly across the entire diameter of the vacuum turntable 112. As will be appreciated by those skilled in the art, other types and kinds of vacuum generating apparatus may be utilized in the practice of the invention depending upon the requirements of particular applications thereof. The intensity of the vacuum that is applied to the vacuum turntable 112 is likewise dependent on the diameter of the vacuum turntable, the rotational speed at which the vacuum turntable is operated, and the types and kinds of wrapped bakery products which are handled by the vacuum turntable.

Figure 3:
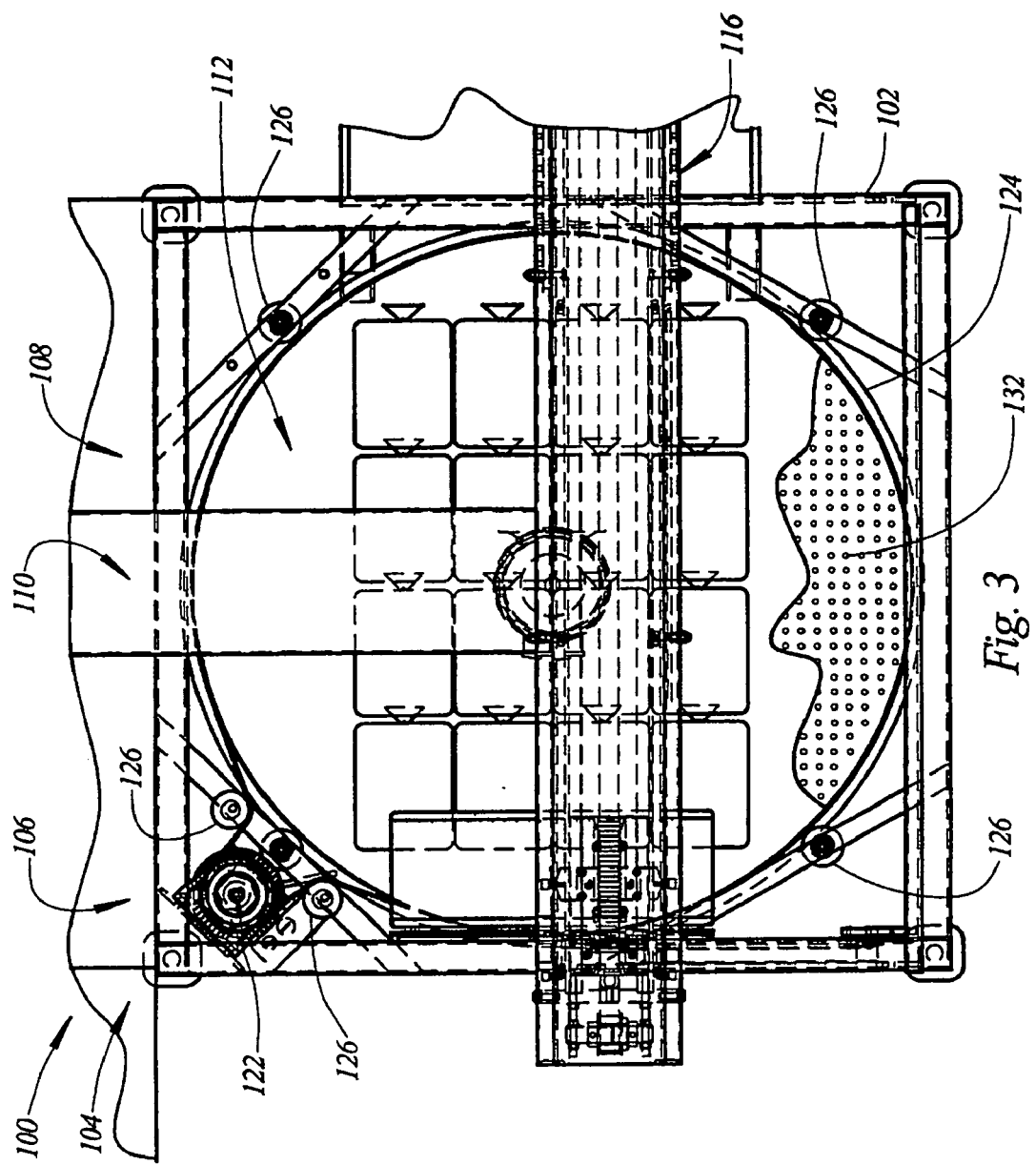
FIG. 3 is an enlargement of a portion of FIG. 2.
Figure 4:
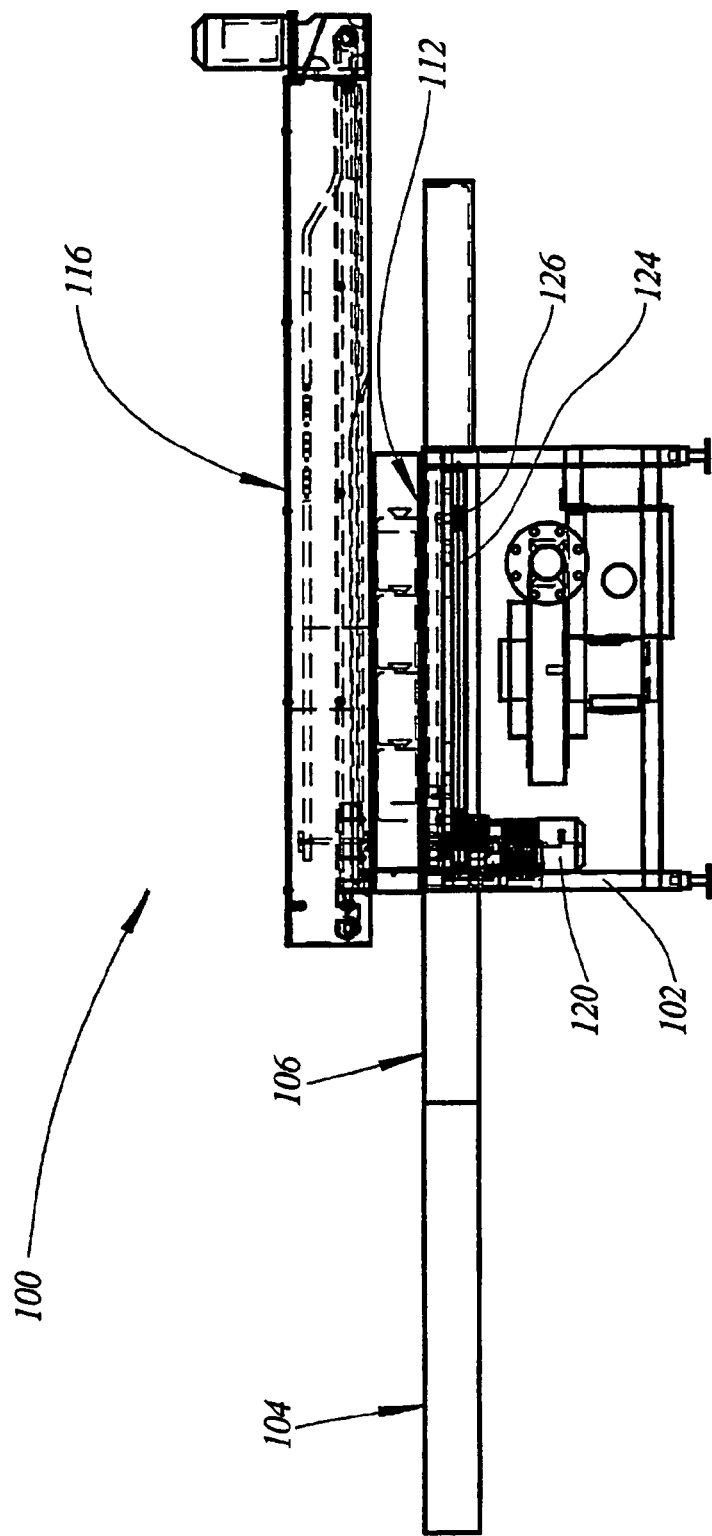
FIG. 4 is a side view of the pattern former of FIG. 1.
Figure 5:
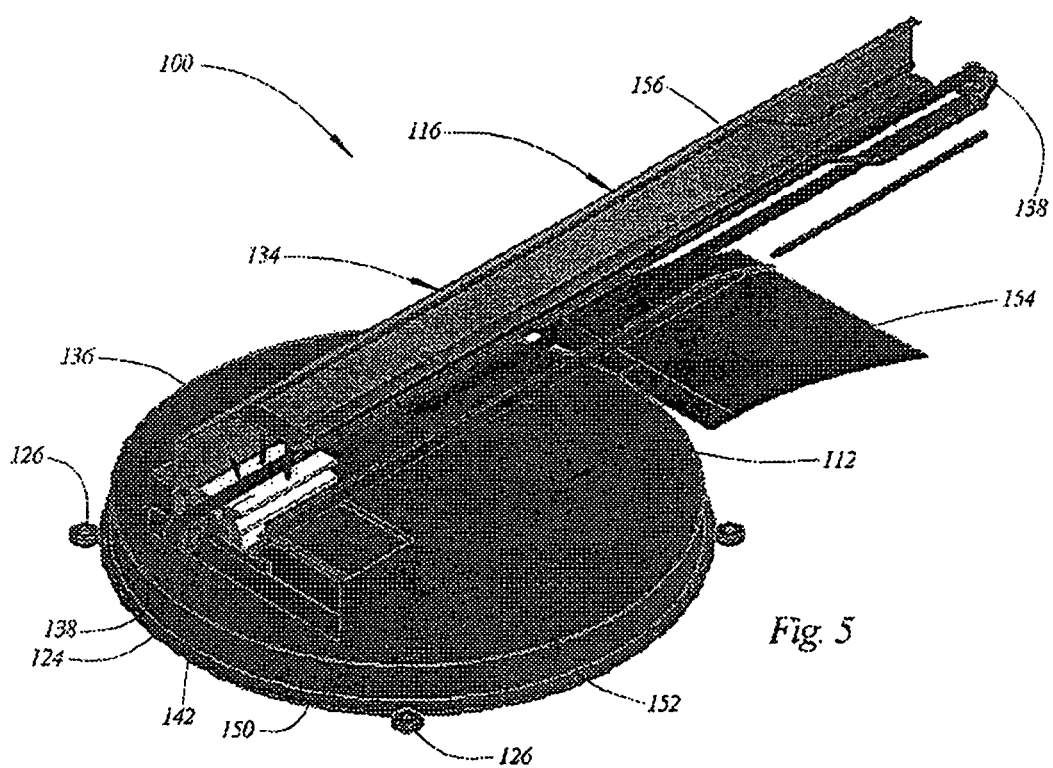
FIG. 5 is a perspective view illustrating the vacuum turntable and the apparatus for filling bakery trays with patterns of wrapped bakery products comprising the pattern former of FIG. 1.
Figure 6:
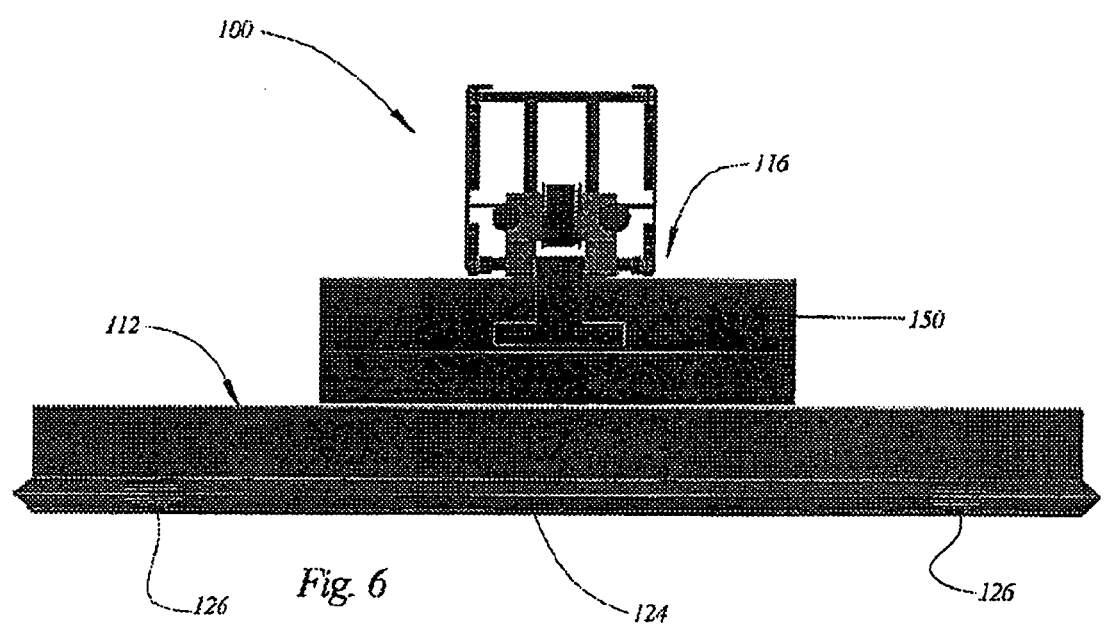
FIG. 6 is an end view of the apparatus of FIG. 5.
Figure 7:
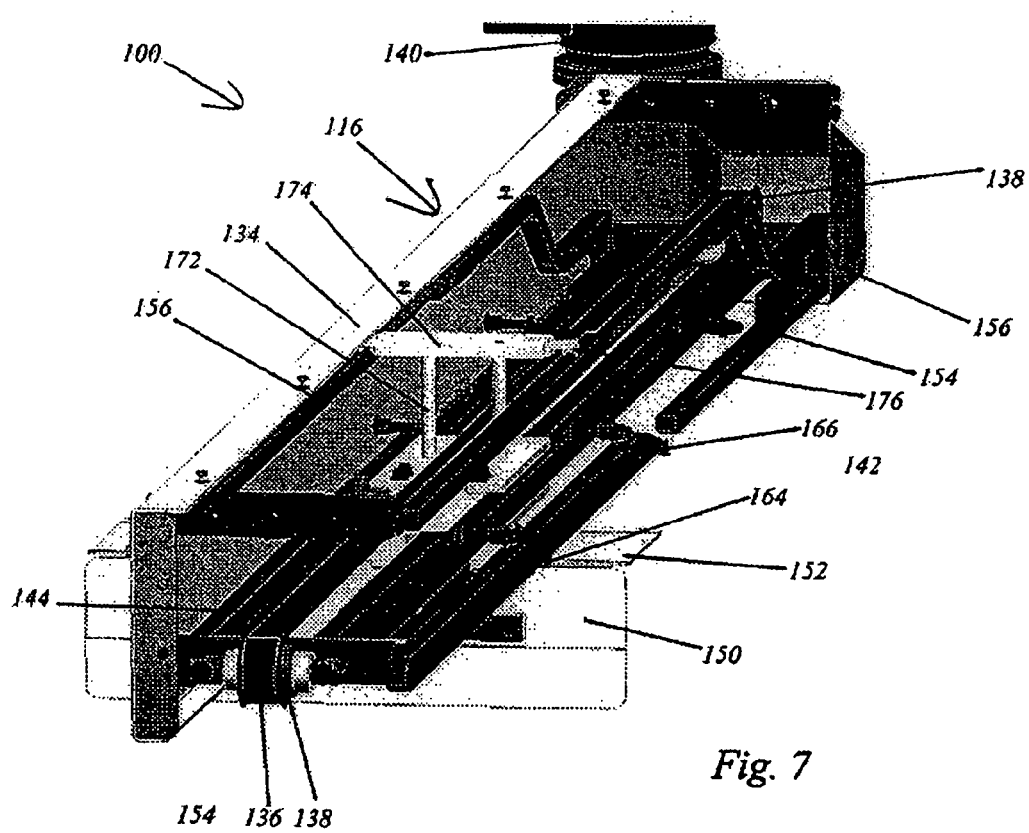
FIG. 7 is a front perspective view of the apparatus for transferring patterns of wrapped bakery products into bakery trays comprising the pattern former of FIG. 1.
Figure 8:
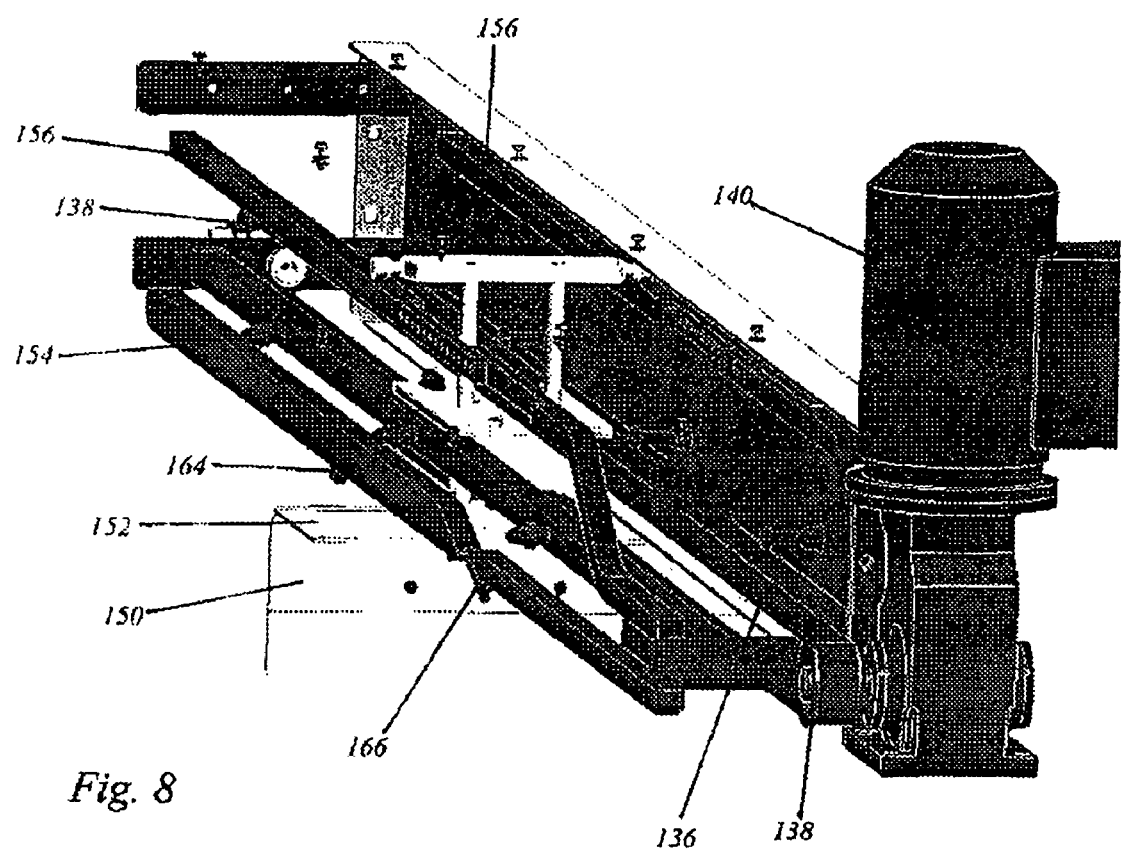
FIG. 8 is a rear perspective view of the apparatus of FIG. 7.
Figure 9:
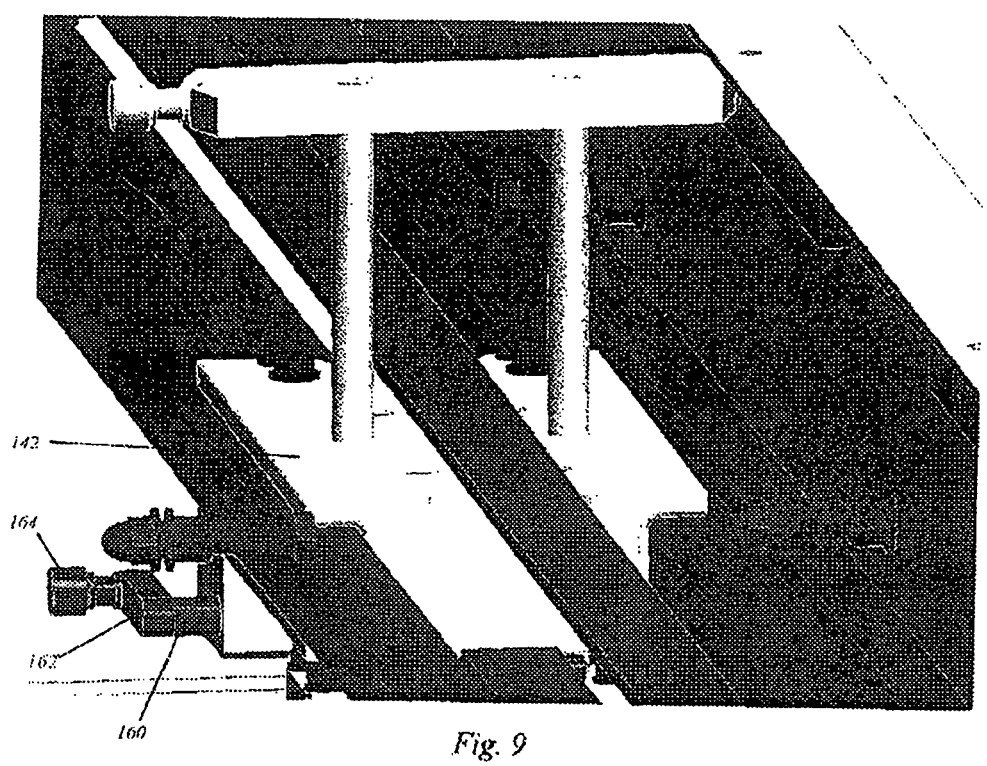
FIG. 9 is an enlargement of a portion of FIG. 8.
Figure 10:
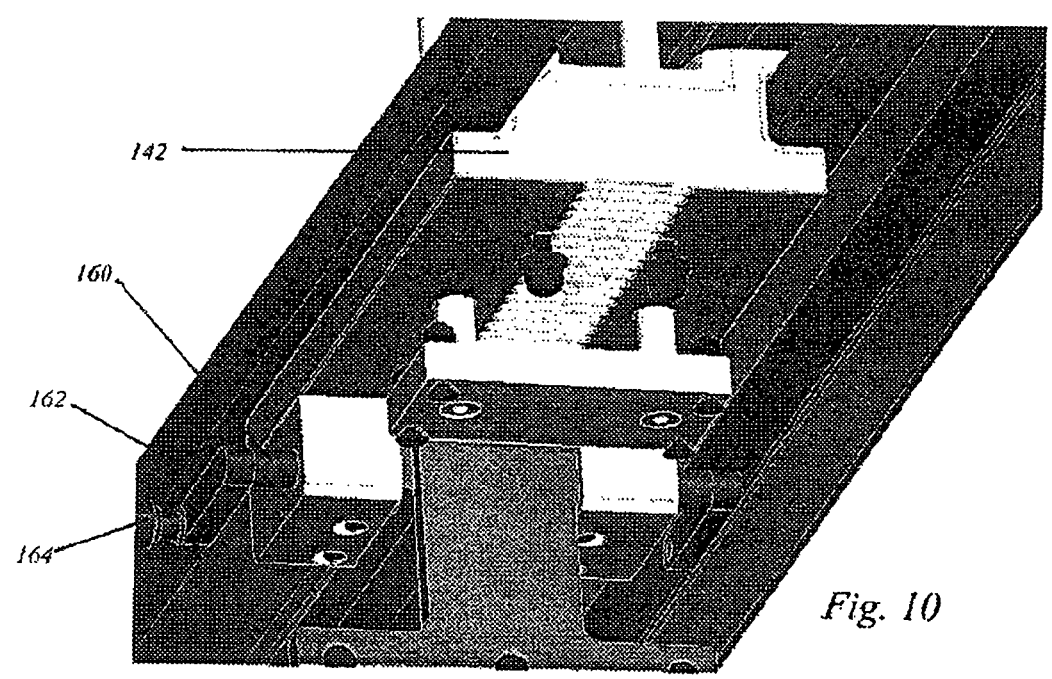
FIG. 10 is a bottom perspective view of a portion of the apparatus of FIG. 8.
Figure 11:
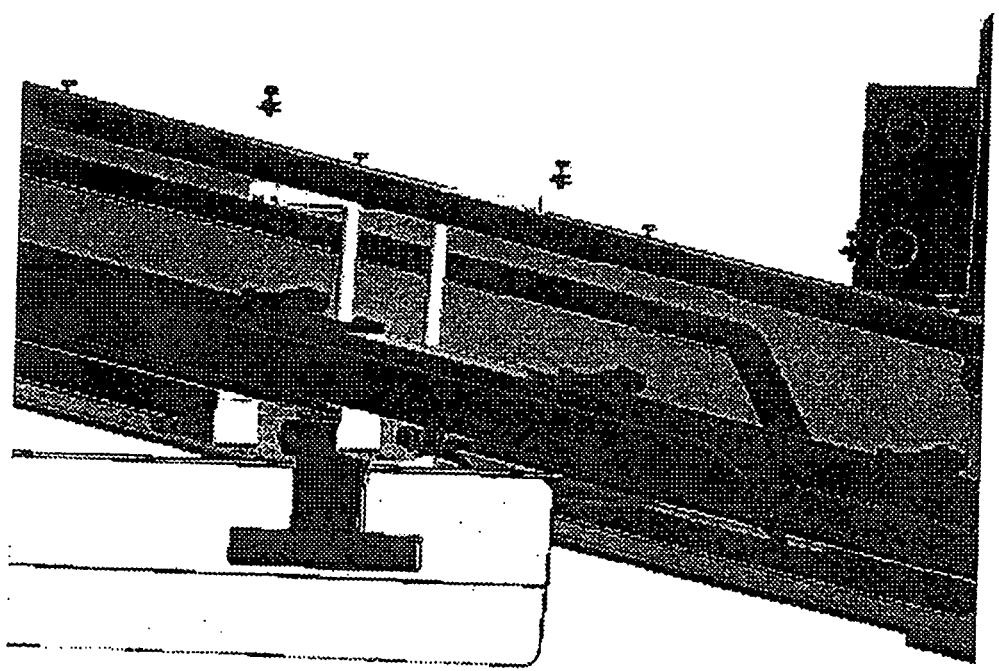
FIG. 11 is an enlargement of a portion of FIG. 7.

Referring particularly to FIGS. 3 and 4, the turntable 112 is driven by a motor 120. A pulley 122 is driven by the motor 120 and in turn drives a belt 124. The belt 124 extends entirely around the turntable 112 and functions to transfer operating power from the motor 120 to the turntable 112. The rotation of the vacuum turntable 112 is guided by a plurality of idler rollers 126 located at spaced intervals around the periphery of the turntable 112.

The use of the belt 124 to rotate the turntable 112 comprises an important feature of the invention. By means of the turntable drive system of the present invention, the high torque loads which are typically imposed on turntable drive shafts are eliminated. Perhaps more importantly, by eliminating the typical turntable drive shaft, the space directly beneath the turntable is made available for the vacuum generating apparatus 118 which applies vacuum to the turntable without interference from the turntable operating mechanism. In this manner, the vacuum is supplied uniformly across the entire diameter of the turntable 112.

The upper surface of the turntable 112 which engages the wrapped bakery products comprises a perforated plate 132. The diameter of the perforations comprising the plate 132 is preferably between about 0.0337 inches and about 0.0340 inches. The spacing between the holes comprising the perforated plate 132 is preferably between about 0.2186 inches and about 0.2225 inches. The thickness of the perforated plate 132 is preferably about 0.020 inches, however, thicker plates can also be used in the practice of the invention, if desired. Those skilled in the art will appreciate and understand the fact that the precise dimensions comprising the diameters of the perforations, the spacing between perforations, and the thickness of the perforated plate 132 of the vacuum turntable 112 can be varied in accordance with the requirements of particular applications of the invention.

The vacuum turntable 112 performs two very important functions in the operation of the pattern former 100. First, the vacuum turntable 112 decelerates individually wrapped bakery products comprising groups of wrapped bakery products which are moved onto the vacuum turntable 112 by the transfer apparatus 110. In this manner each wrapped bakery product comprising a group thereof is precisely positioned on the vacuum turntable 112 without danger of the wrapped bakery product moving beyond its intended location due to inertia. The vacuum turntable 112 also functions to firmly retain the wrapped bakery products received thereon during rotation of the vacuum turntable 112 to form the desired pattern of wrapped bakery products. This is true even if the wrapped bakery products are positioned near the outer circumference of the vacuum turntable 112. Perhaps most importantly, the vacuum turntable 112 properly decelerates wrapped bakery products received thereon and subsequently firmly retains the wrapped bakery products during rotation with no damage to the bakery products or the wrapping thereof.

FIGS. 5–11, inclusive, illustrate the construction and operation of the apparatus 116 which transfers patterns of wrapped bakery products from the vacuum turntable 112 to bakery trays for transportation from the bakery to retail outlets. The apparatus 116 includes a housing 134 which encloses a drive belt 136. The drive belt 136 moves along a course defined by pulleys 138 and is driven by a motor 140. A traveler 142 is secured to the belt 136 for movement thereby along a substantially horizontal course defined by slideways 144. The slideways 144 support the traveler 142 for movement under the action of the belt 136.

The traveler 142 supports a pusher plate 150 and a spanker plate 152. The pusher plate 150 is actuated by pusher plate cams 154 and the spanker plate 152 is actuated by spanker plate cams 156.

As is best shown in FIGS. 8, 9, 10, and 11, the pusher plate 150 is supported on a rod 160 which is pivotally supported on the traveler 142. A bell crank 162 extends from each end of the rod 160, and a cam follower 164 is supported at the distal end of each bell crank 162. The weight of the pusher plate 150 normally pivots the pusher plate 150 downwardly thereby pivoting the cam followers 164 upwardly and into engagement with camming surfaces comprising the lower surfaces of the pusher plate cams 154.

The pusher plate cams 154 include pivotally supported sections 166. As the pusher plate 150 moves away from the turntable 112 and toward the motor 140, the cam followers 164 engage the pivotally supported sections 166 which thereupon pivot upwardly allowing the cam followers 164 to continue in engagement with the lower camming surfaces of the pusher plate cams 154.

When the pusher plate 150 reaches the end of its travel away from the turntable 112 and toward the motor 140, the direction of movement of the belt 136 is reversed and the pusher plate 150 is moved in the opposite direction, i.e., away from the motor 140 and toward the turntable 112. The cam followers 164 engage the pivotally supported sections 166 of the pusher plate cams 154 thereby causing the cam followers 164 to ride upwardly and into engagement with upper camming surfaces comprising the pusher plate cams 154. Engagement of the cam followers 164 with the upper camming surfaces of the pusher plate cams 154 pivots the pusher plate 150 upwardly into an orientation in which it extends parallel to the pusher plate cams 154. This allows the pusher plate 150 to pass over a pattern of wrapped baked goods which has been assembled on the vacuum turntable 112 as the pusher plate 150 was moving a previously assembled pattern off the turntable 112 and into a bakery tray.

The spanker plate 152 is supported on rods 172 which are sidedly supported in the traveler 142. The rods 172 extend to a bar 174 which in turn extends to cam followers 176 which engage the spanker plate cams 156. As will be appreciated by those skilled in the art, the spanker plate cams 156 allow the spanker plate 152 to move downwardly as the traveler 142 reaches the limit of its travel in the direction extending away from the vacuum turntable 112 and towards the motor 140. As the traveler 142 begins its reverse movement, i.e., away from the motor 140 and toward the vacuum turntable 112, the spanker plate cams 156 return the spanker plate 152 to the position illustrated in FIGS. 5–11, inclusive.

Figure 12:
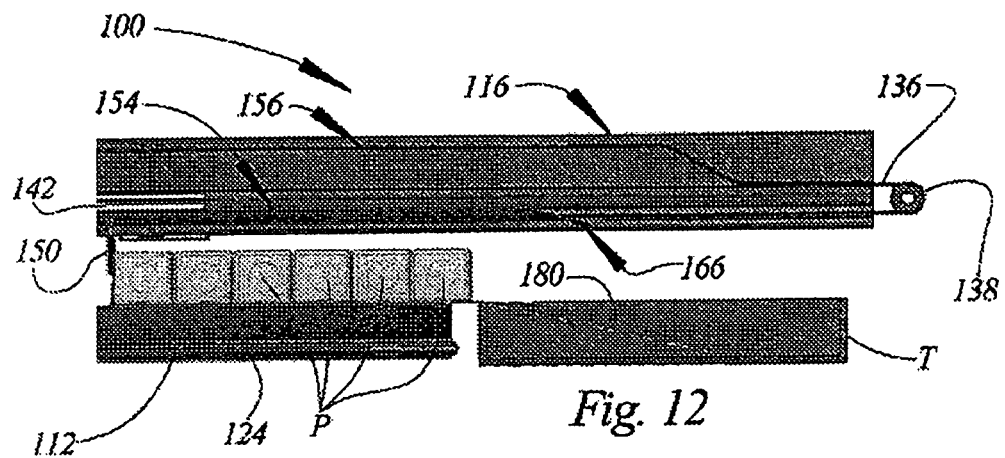
FIG. 12 is an illustration of an initial step in the operation of the apparatus shown in FIGS. 5–11.
Figure 13:
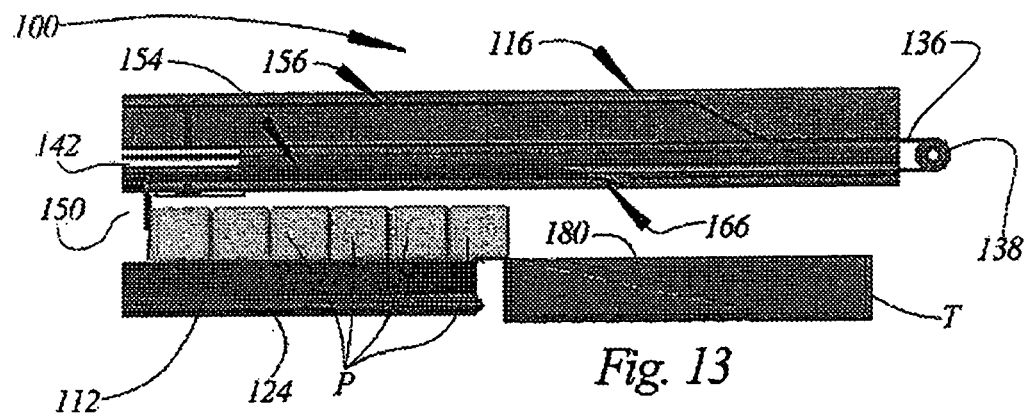
FIG. 13 is an illustration of a subsequent step in the operation of the apparatus shown in FIGS. 5–11.
Figure 14:
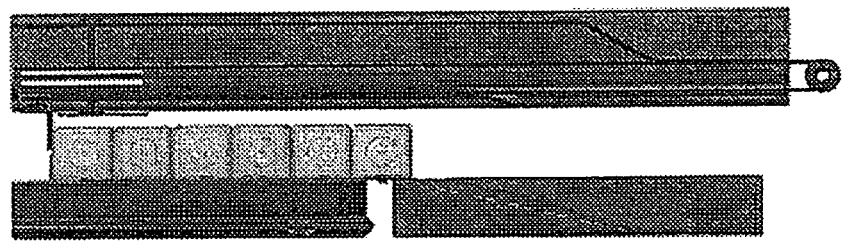
FIG. 14 is an illustration of a subsequent step in the operation of the apparatus shown in FIGS. 5–11.
Figure 15:
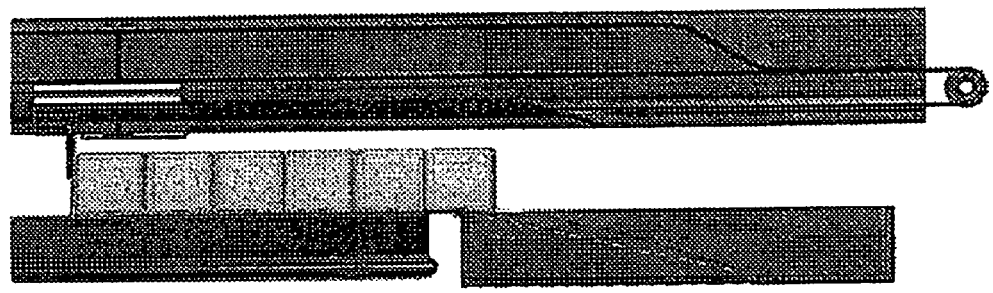
FIG. 15 is an illustration of a subsequent step in the operation of the apparatus shown in FIGS. 5–11.
Figure 16:
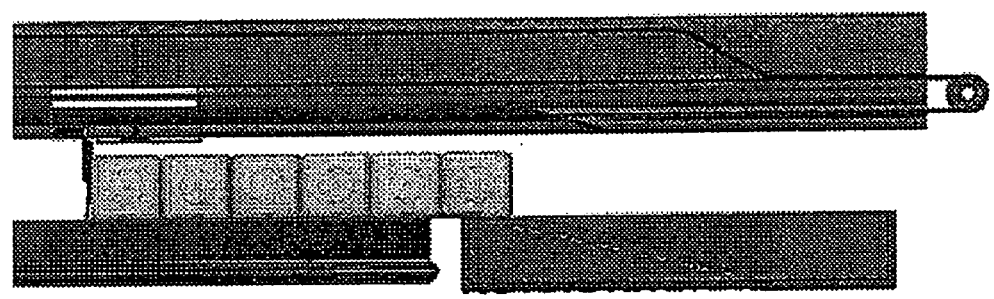
FIG. 16 is an illustration of a subsequent step in the operation of the apparatus shown in FIGS. 5–11.
Figure 17:
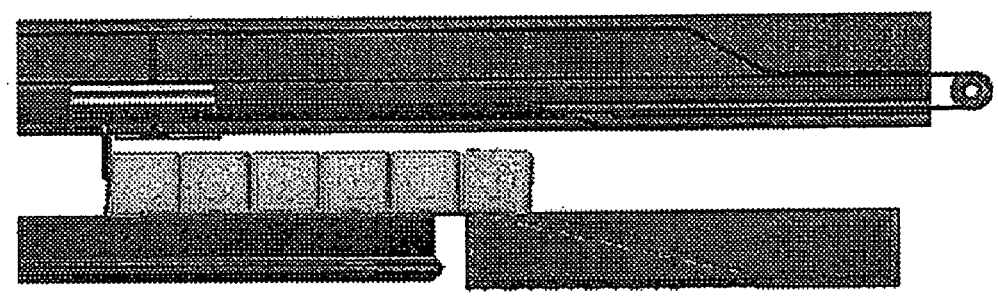
FIG. 17 is an illustration of a subsequent step in the operation of the apparatus shown in FIGS. 5–11.
Figure 18:
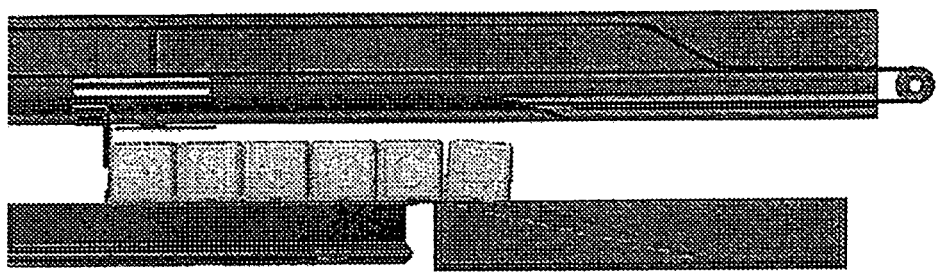
FIG. 18 is an illustration of a subsequent step in the operation of the apparatus shown in FIGS. 5–11.
Figure 19:
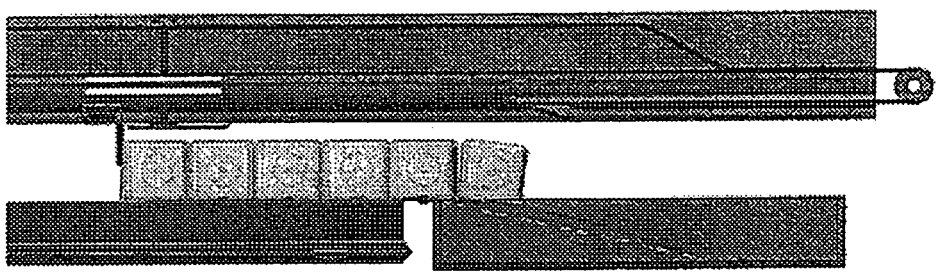
FIG. 19 is an illustration of a subsequent step in the operation of the apparatus shown in FIGS. 5–11.
Figure 20:
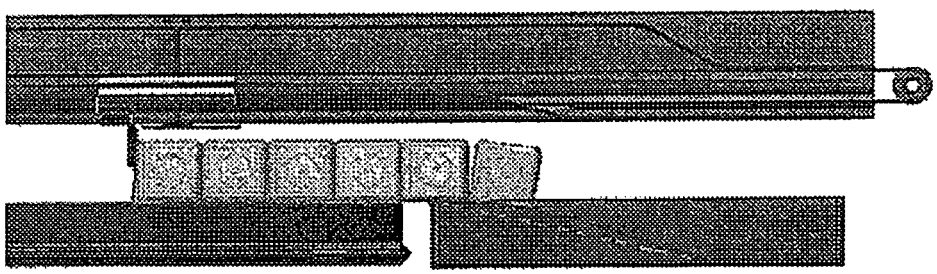
FIG. 20 is an illustration of a subsequent step in the operation of the apparatus shown in FIGS. 5–11.
Figure 21:
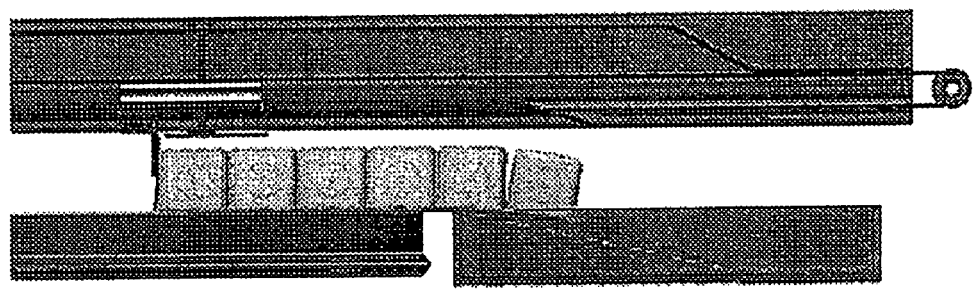
FIG. 21 is an illustration of a subsequent step in the operation of the apparatus shown in FIGS. 5–11.
Figure 22:
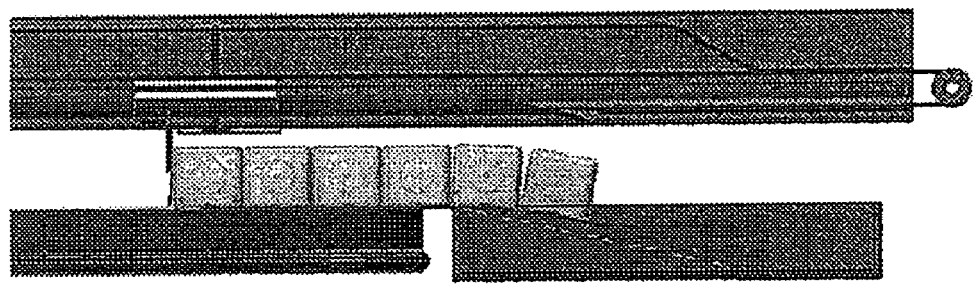
FIG. 22 is an illustration of a subsequent step in the operation of the apparatus shown in FIGS. 5–11.
Figure 23:
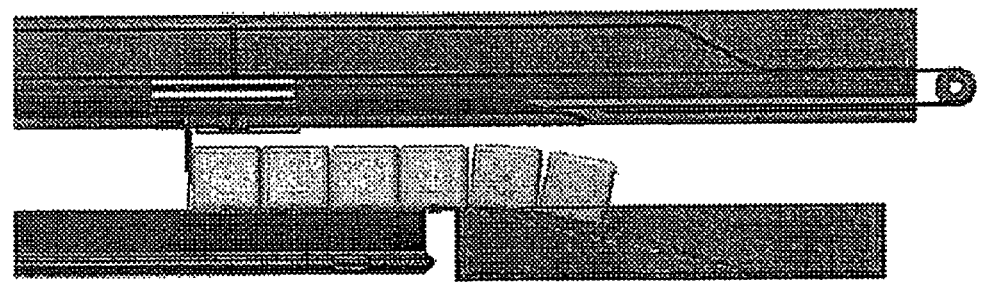
FIG. 23 is an illustration of a subsequent step in the operation of the apparatus shown in FIGS. 5–11.
Figure 24:
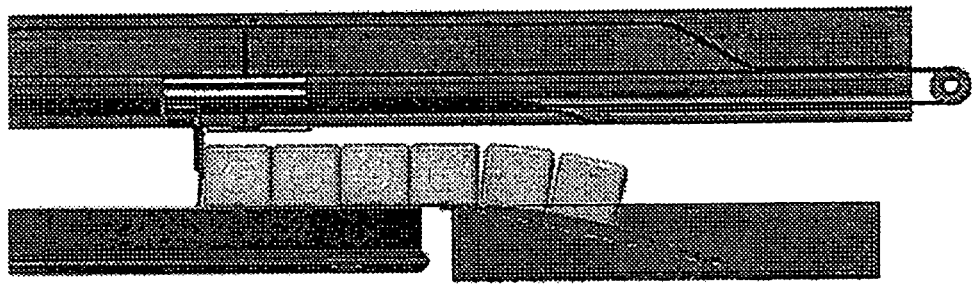
FIG. 24 is an illustration of a subsequent step in the operation of the apparatus shown in FIGS. 5–11.
Figure 25:
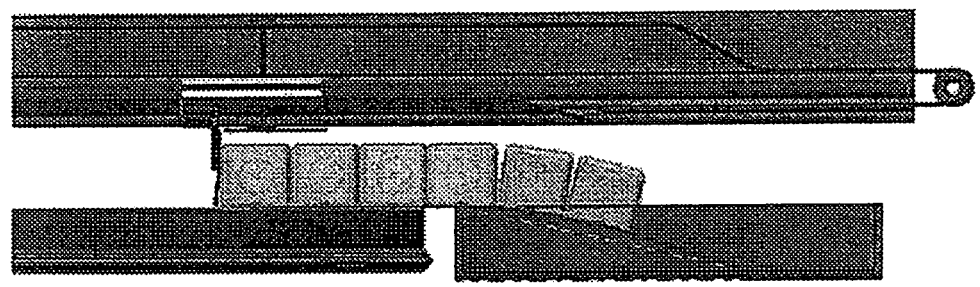
FIG. 25 is an illustration of a subsequent step in the operation of the apparatus shown in FIGS. 5–11.
Figure 26:
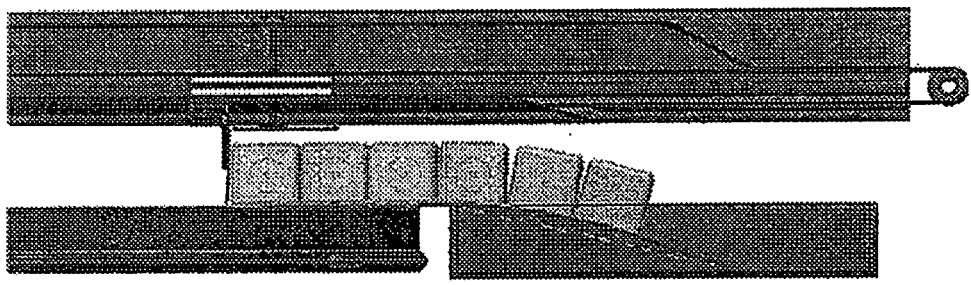
FIG. 26 is an illustration of a subsequent step in the operation of the apparatus shown in FIGS. 5–11.
Figure 27:
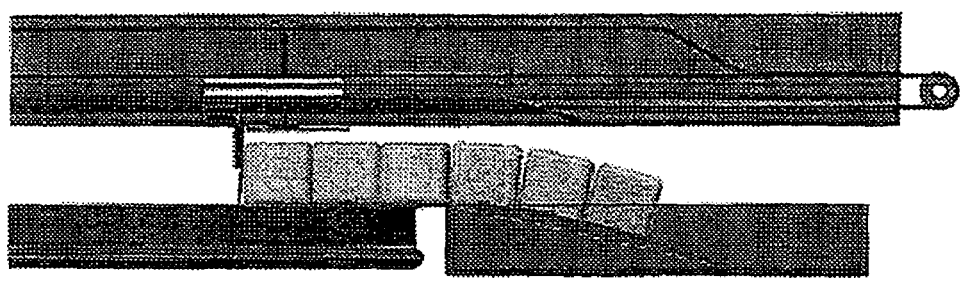
FIG. 27 is an illustration of a subsequent step in the operation of the apparatus shown in FIGS. 5–11.
Figure 28:
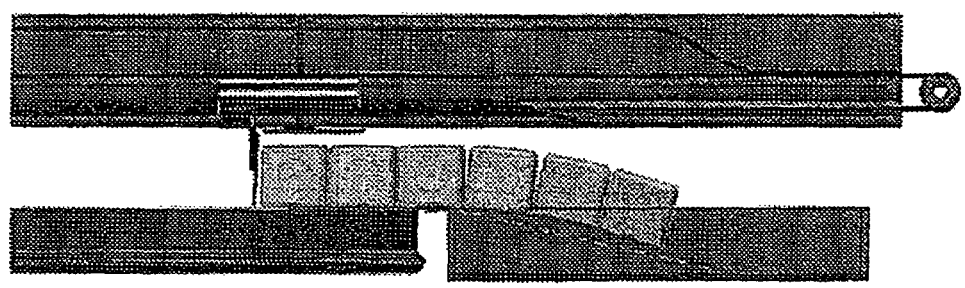
FIG. 28 is an illustration of a subsequent step in the operation of the apparatus shown in FIGS. 5–11.
Figure 29:
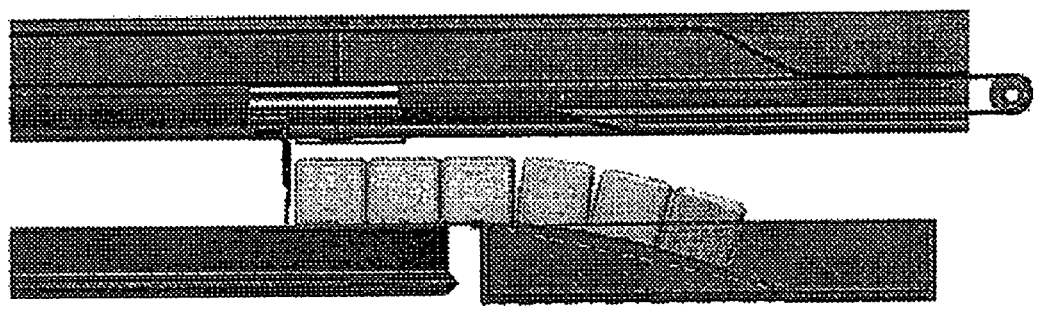
FIG. 29 is an illustration of a subsequent step in the operation of the apparatus shown in FIGS. 5–11.
Figure 30:
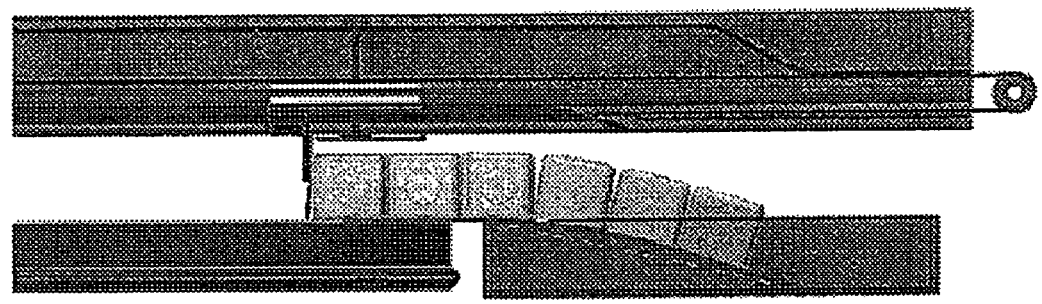
FIG. 30 is an illustration of a subsequent step in the operation of the apparatus shown in FIGS. 5–11.
Figure 31:
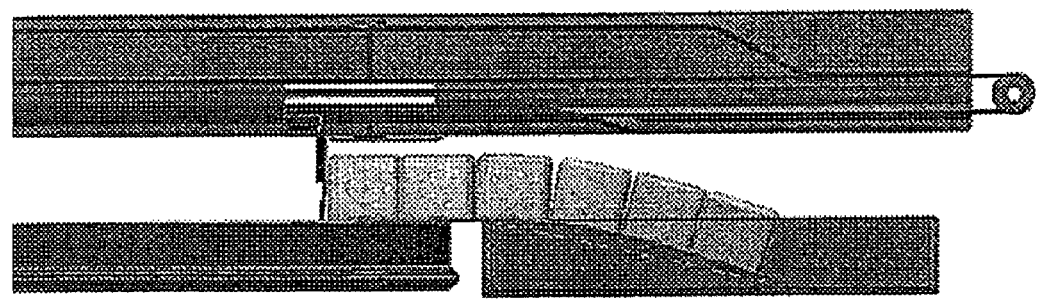
FIG. 31 is an illustration of a subsequent step in the operation of the apparatus shown in FIGS. 5–11.
Figure 32:
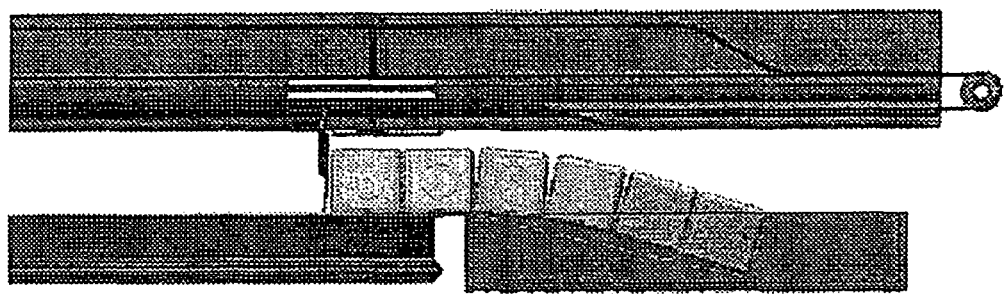
FIG. 32 is an illustration of a subsequent step in the operation of the apparatus shown in FIGS. 5–11.
Figure 33:
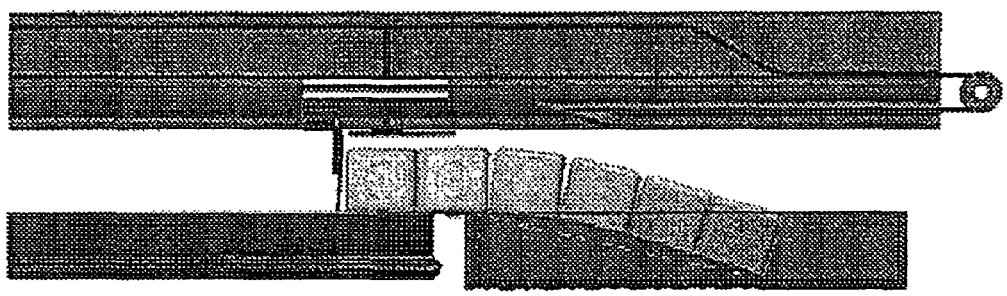
FIG. 33 is an illustration of a subsequent step in the operation of the apparatus shown in FIGS. 5–11.
Figure 34:
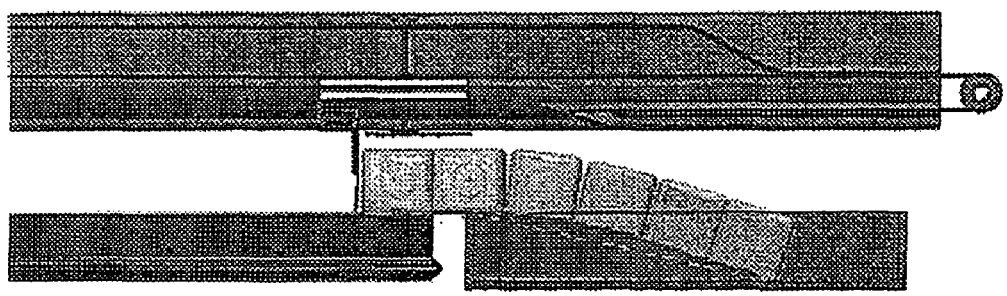
FIG. 34 is an illustration of a subsequent step in the operation of the apparatus shown in FIGS. 5–11.
Figure 35:
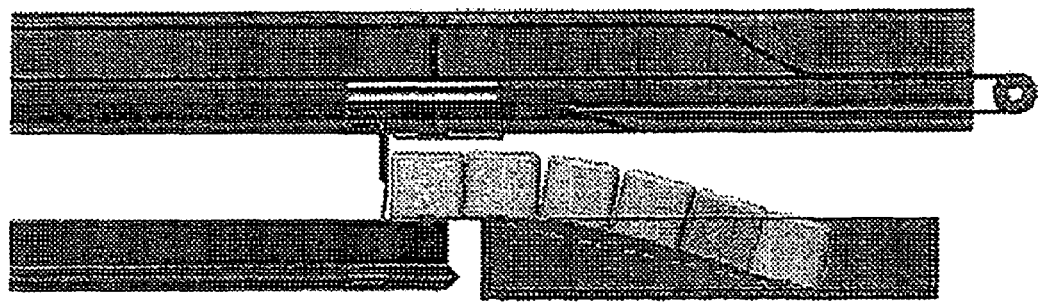
FIG. 35 is an illustration of a subsequent step in the operation of the apparatus shown in FIGS. 5–11.
Figure 36:
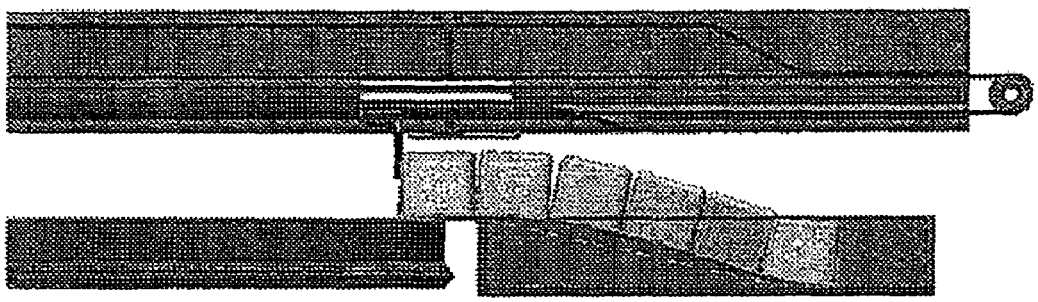
FIG. 36 is an illustration of a subsequent step in the operation of the apparatus shown in FIGS. 5–11.
Figure 37:
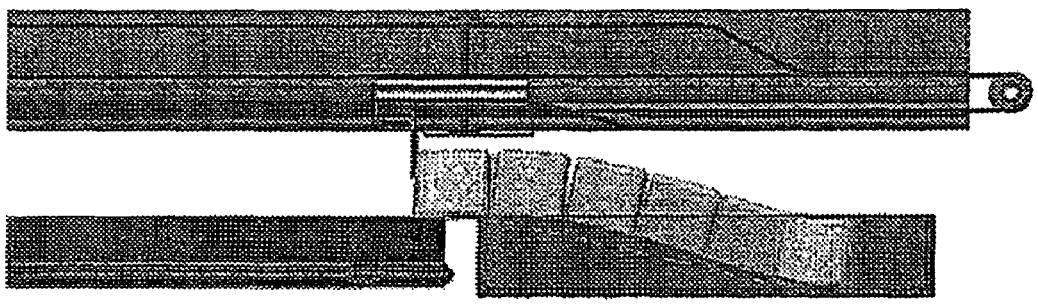
FIG. 37 is an illustration of a subsequent step in the operation of the apparatus shown in FIGS. 5–11.
Figure 38:
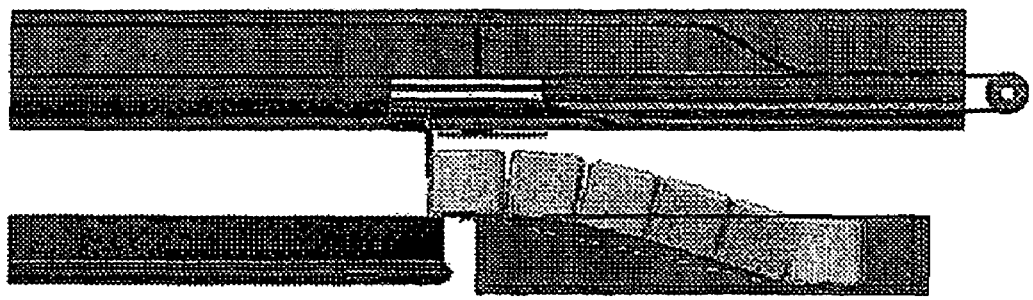
FIG. 38 is an illustration of a subsequent step in the operation of the apparatus shown in FIGS. 5–11.
Figure 39:
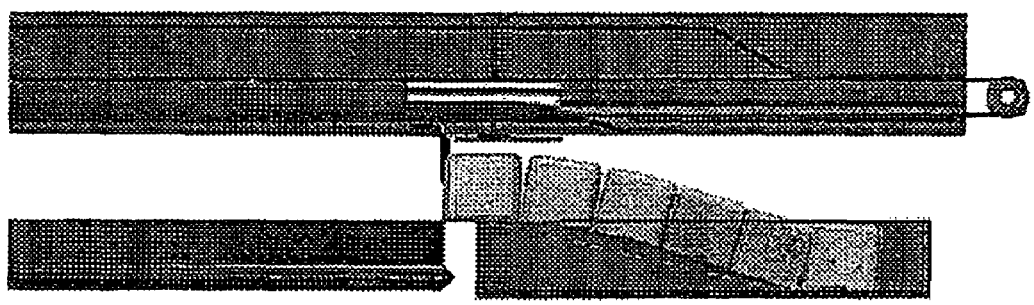
FIG. 39 is an illustration of a subsequent step in the operation of the apparatus shown in FIGS. 5–11.
Figure 40:
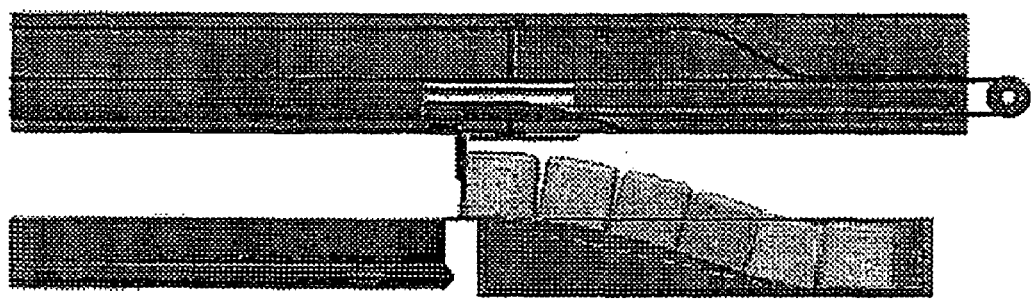
FIG. 40 is an illustration of a subsequent step in the operation of the apparatus shown in FIGS. 5–11.
Figure 41:
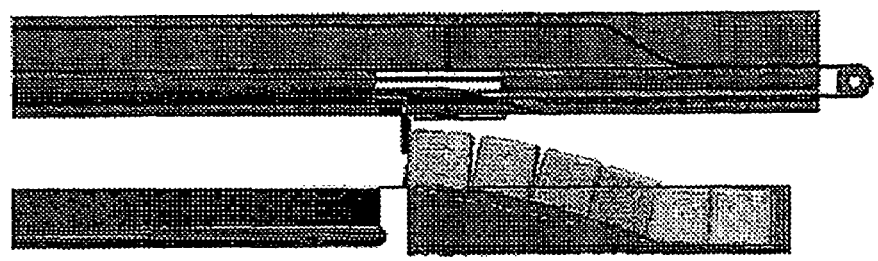
FIG. 41 is an illustration of a subsequent step in the operation of the apparatus shown in FIGS. 5–11.
Figure 42:
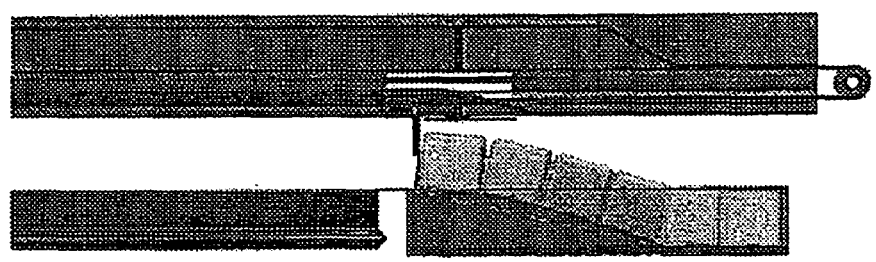
FIG. 42 is an illustration of a subsequent step in the operation of the apparatus shown in FIGS. 5–11.
Figure 43:
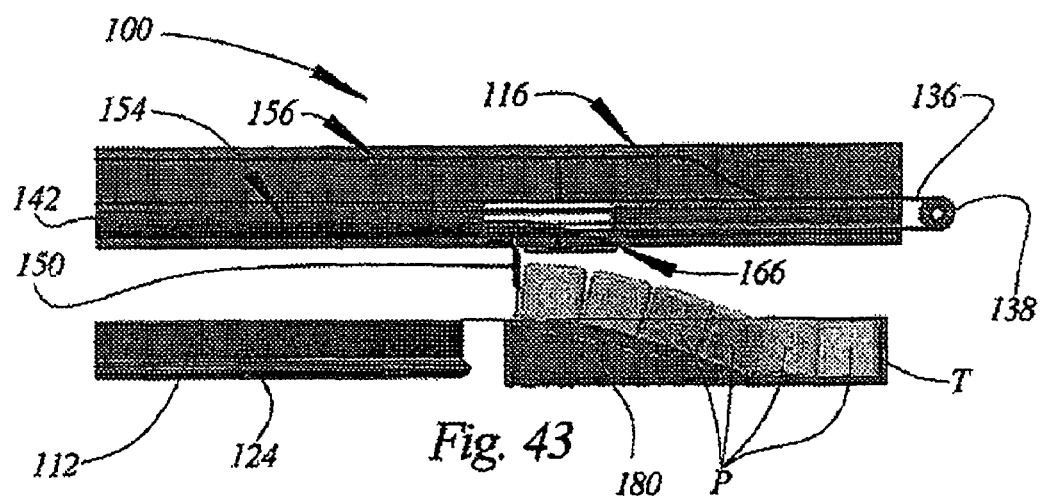
FIG. 43 is an illustration of a subsequent step in the operation of the apparatus shown in FIGS. 5–11.
Figure 44:
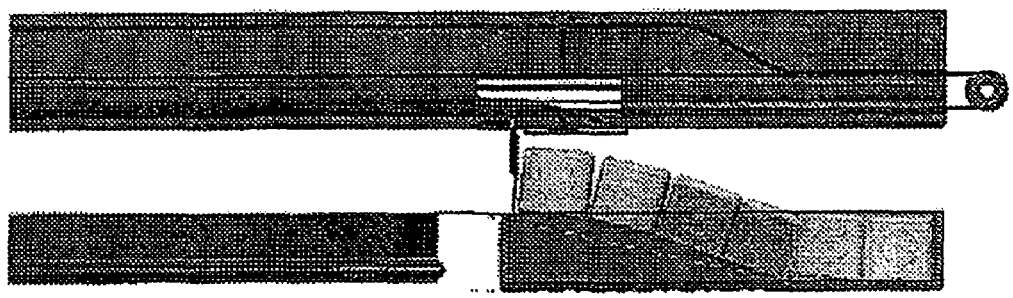
FIG. 44 is an illustration of a subsequent step in the operation of the apparatus shown in FIGS. 5–11.
Figure 45:
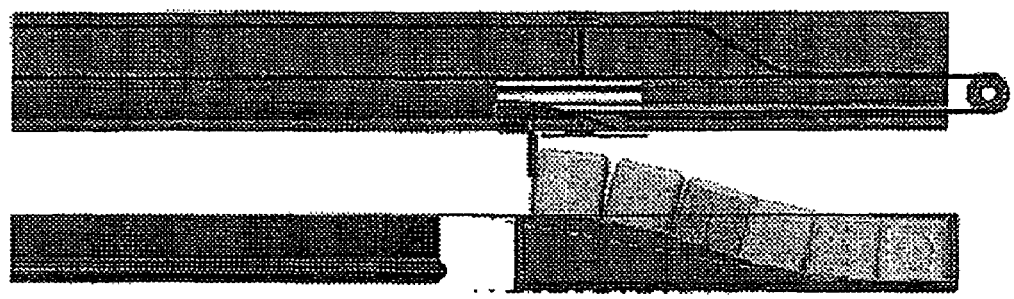
FIG. 45 is an illustration of a subsequent step in the operation of the apparatus shown in FIGS. 5–11.
Figure 46:
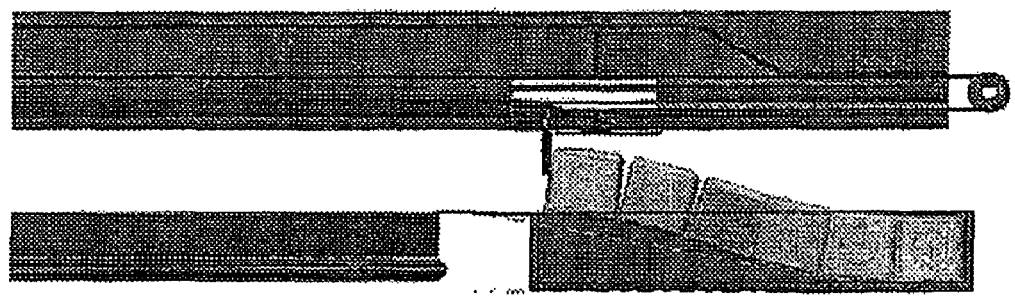
FIG. 46 is an illustration of a subsequent step in the operation of the apparatus shown in FIGS. 5–11.
Figure 47:
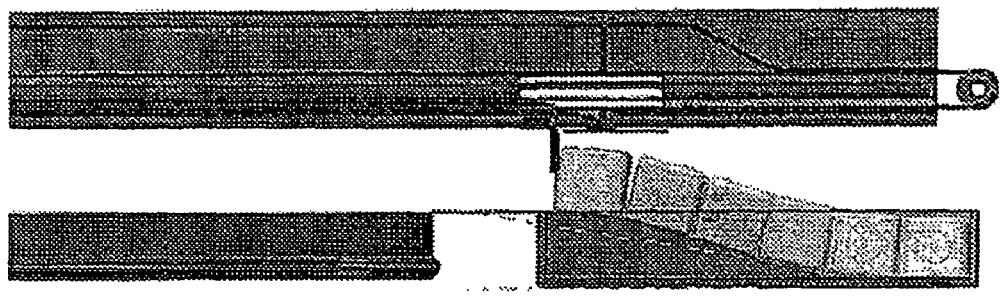
FIG. 47 is an illustration of a subsequent step in the operation of the apparatus shown in FIGS. 5–11.
Figure 48:
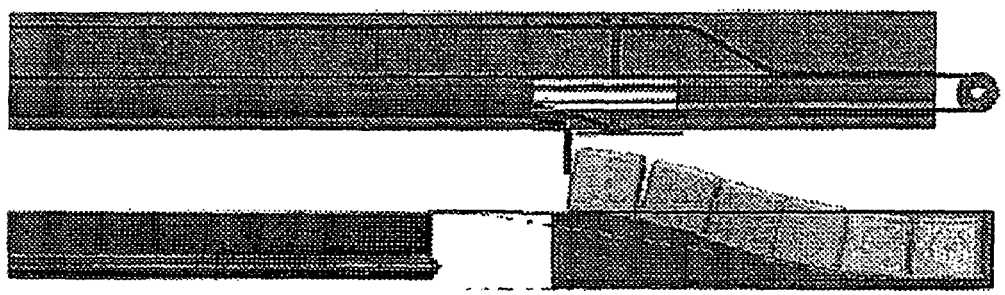
FIG. 48 is an illustration of a subsequent step in the operation of the apparatus shown in FIGS. 5–11.
Figure 49:
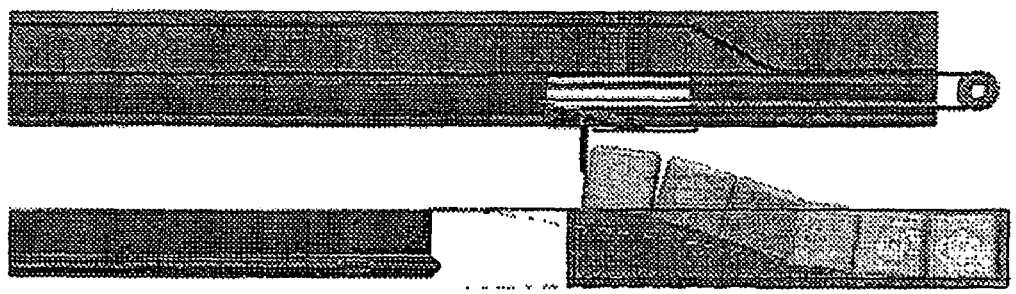
FIG. 49 is an illustration of a subsequent step in the operation of the apparatus shown in FIGS. 5–11.
Figure 50:
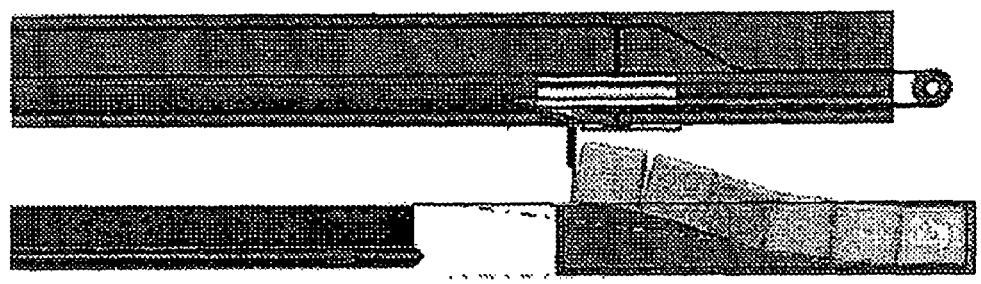
FIG. 50 is an illustration of a subsequent step in the operation of the apparatus shown in FIGS. 5–11.
Figure 51:
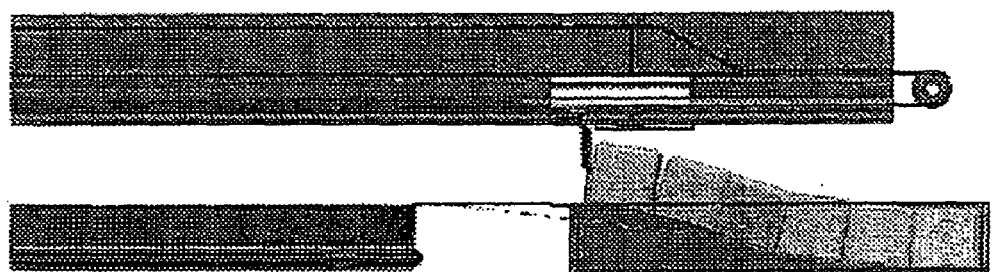
FIG. 51 is an illustration of a subsequent step in the operation of the apparatus shown in FIGS. 5–11.
Figure 52:
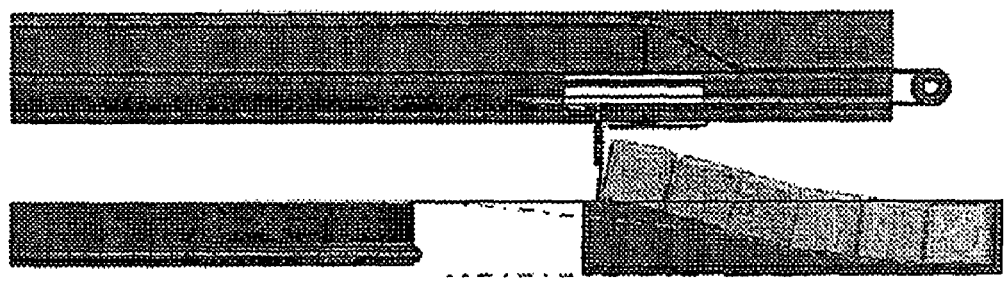
FIG. 52 is an illustration of a subsequent step in the operation of the apparatus shown in FIGS. 5–11.
Figure 53:
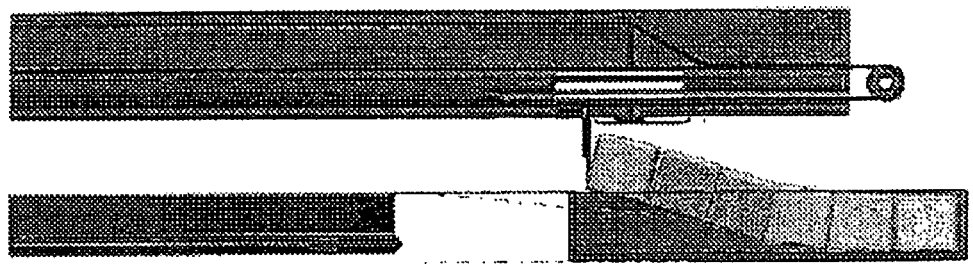
FIG. 53 is an illustration of a subsequent step in the operation of the apparatus shown in FIGS. 5–11.
Figure 54:
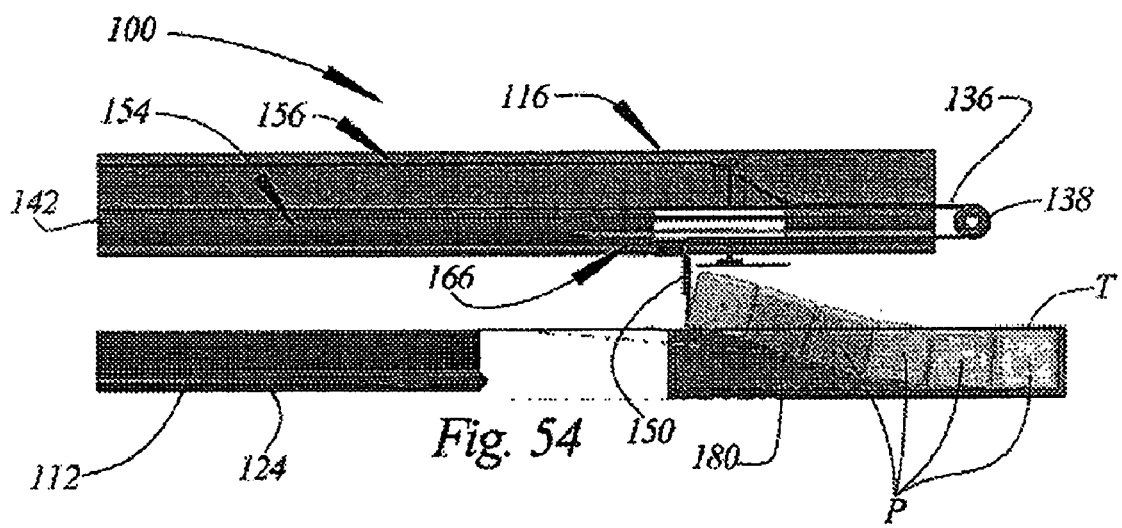
FIG. 54 is an illustration of a subsequent step in the operation of the apparatus shown in FIGS. 5–11.
Figure 55:
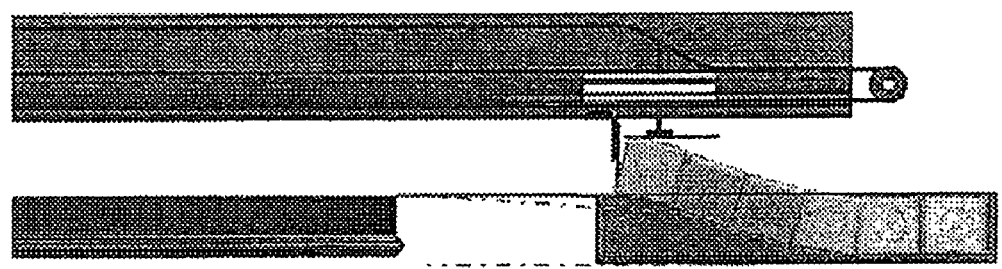
FIG. 55 is an illustration of a subsequent step in the operation of the apparatus shown in FIGS. 5–11.
Figure 56:
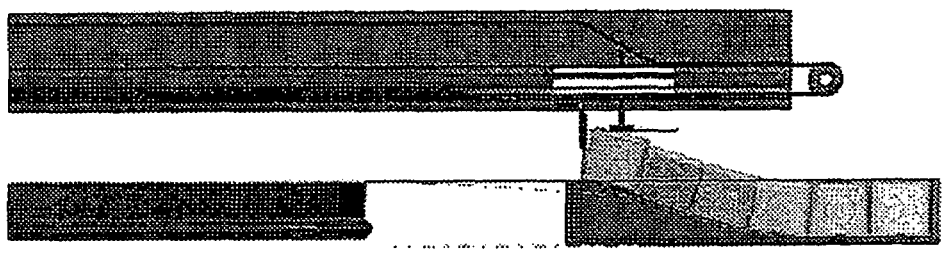
FIG. 56 is an illustration of a subsequent step in the operation of the apparatus shown in FIGS. 5–11.
Figure 57:
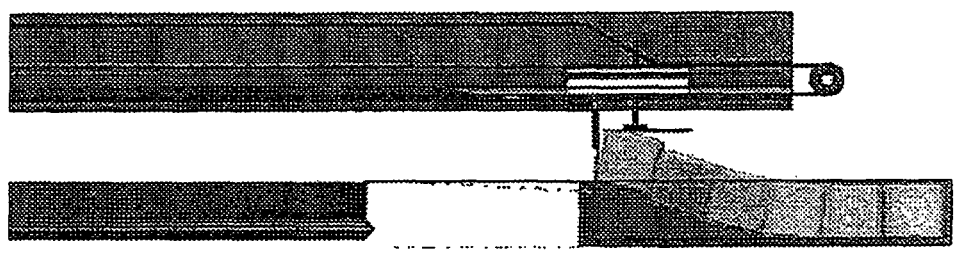
FIG. 57 is an illustration of a subsequent step in the operation of the apparatus shown in FIGS. 5–11.
Figure 58:
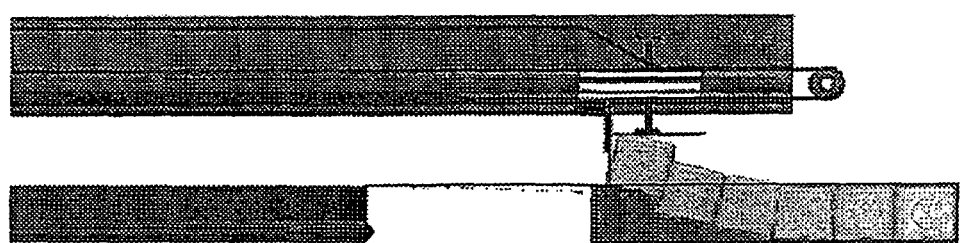
FIG. 58 is an illustration of a subsequent step in the operation of the apparatus shown in FIGS. 5–11.
Figure 59:
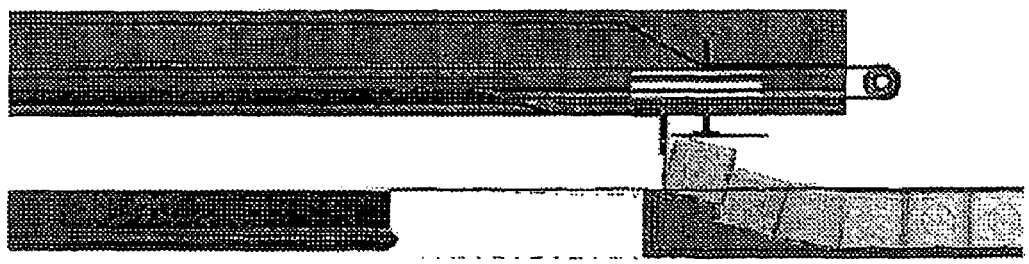
FIG. 59 is an illustration of a subsequent step in the operation of the apparatus shown in FIGS. 5–11.
Figure 60:
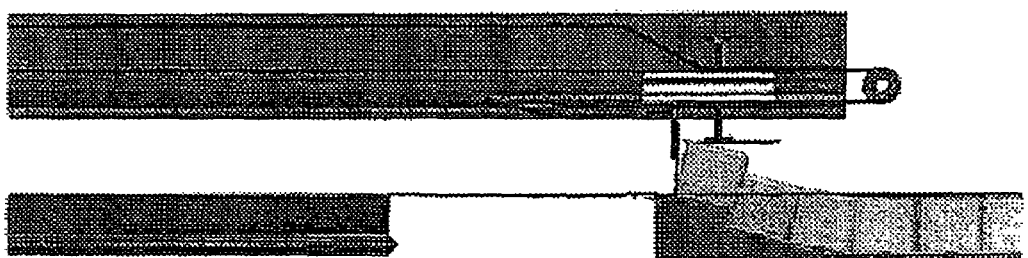
FIG. 60 is an illustration of a subsequent step in the operation of the apparatus shown in FIGS. 5–11.
Figure 61:
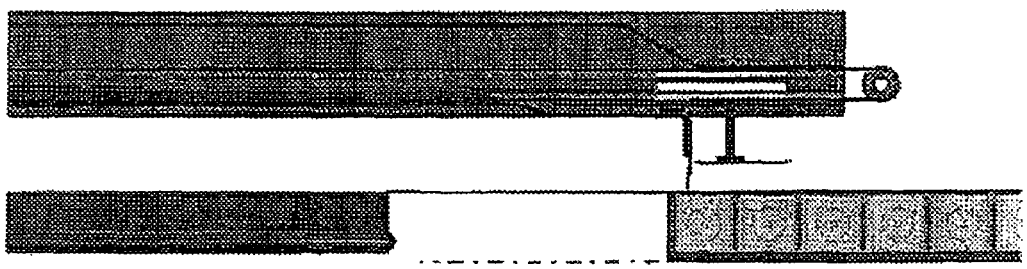
FIG. 61 is an illustration of a subsequent step in the operation of the apparatus shown in FIGS. 5–11.
Figure 62:
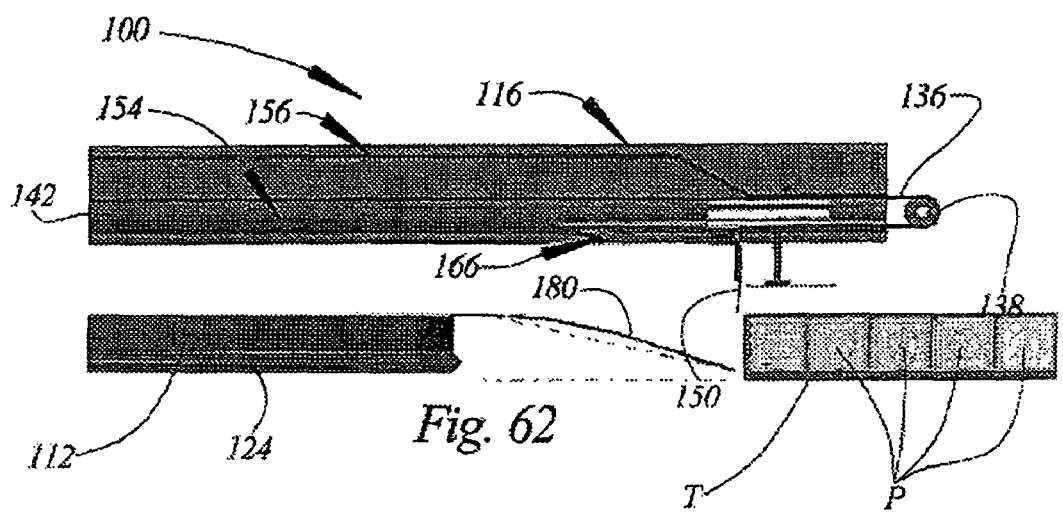
FIG. 62 is an illustration of a subsequent step in the operation of the apparatus shown in FIGS. 5–11.
Figure 63:
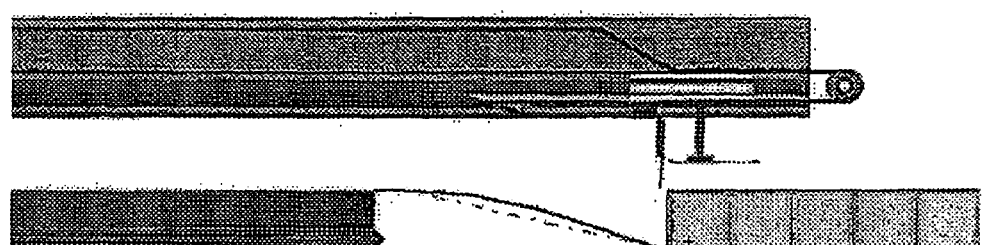
FIG. 63 is an illustration of a subsequent step in the operation of the apparatus shown in FIGS. 5–11.
Figure 64:
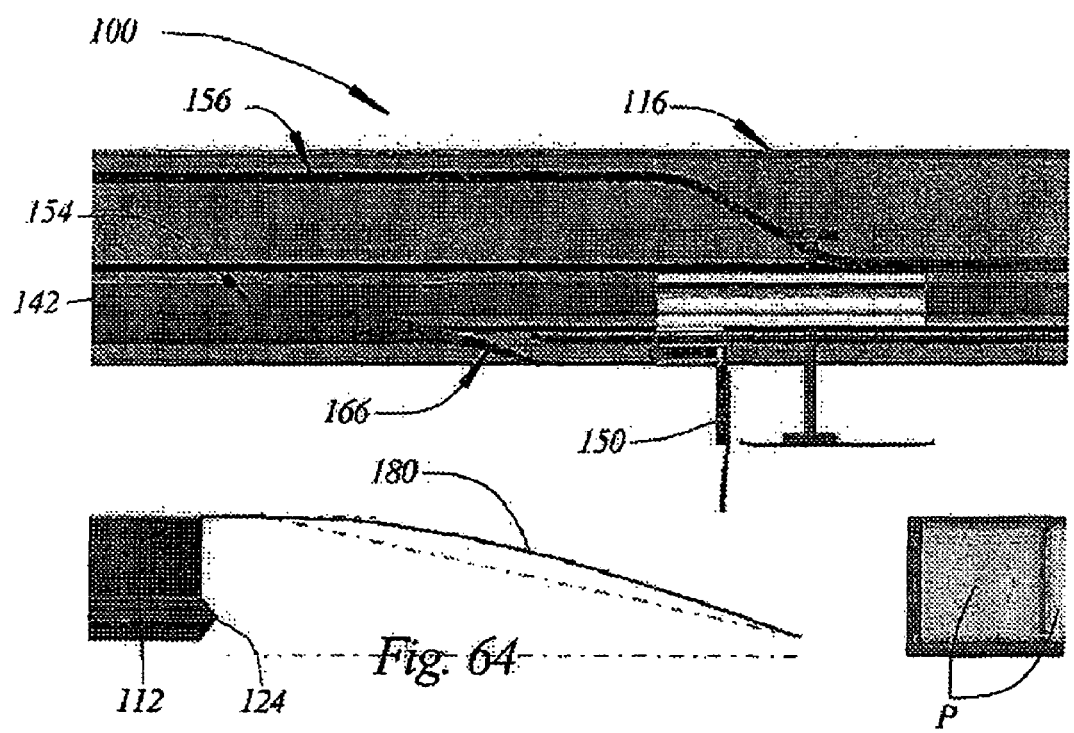
FIG. 64 is an illustration of a subsequent step in the operation of the apparatus shown in FIGS. 5–11.
Figure 65:
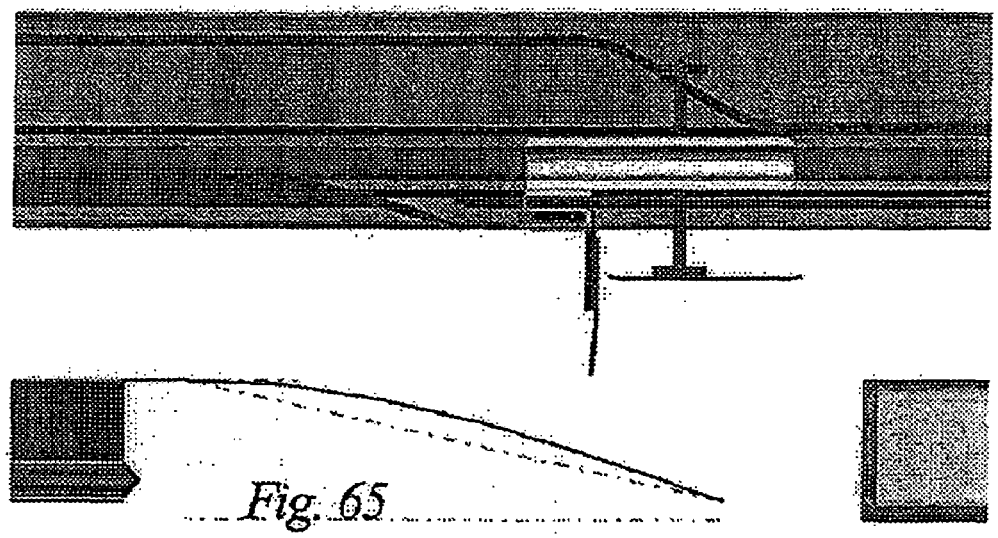
FIG. 65 is an illustration of a subsequent step in the operation of the apparatus shown in FIGS. 5–11.
Figure 66:
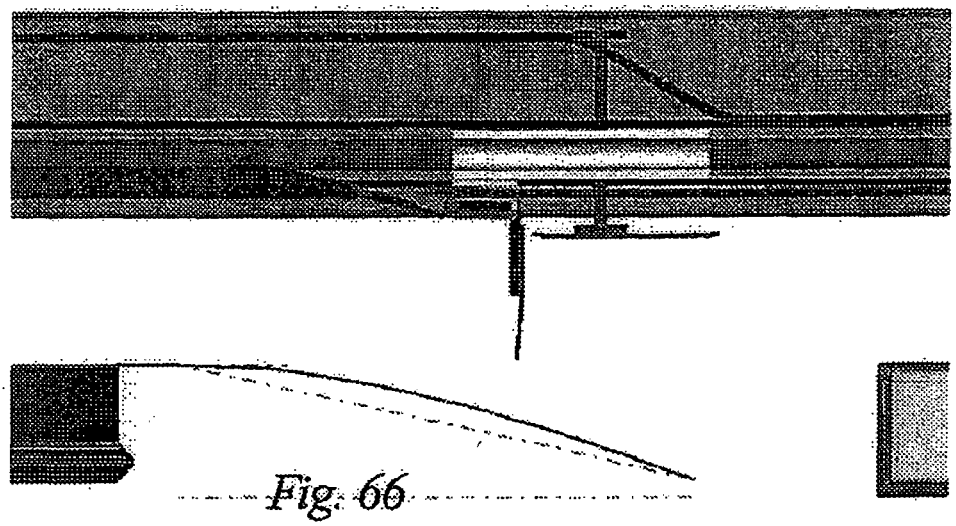
FIG. 66 is an illustration of a subsequent step in the operation of the apparatus shown in FIGS. 5–11.
Figure 67:
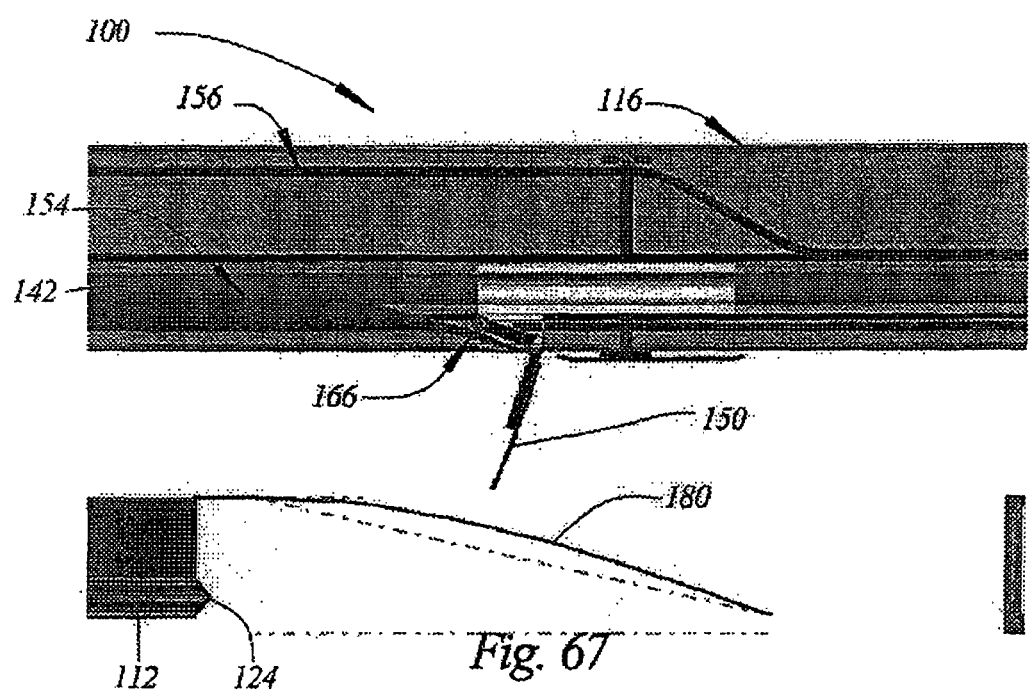
FIG. 67 is an illustration of a subsequent step in the operation of the apparatus shown in FIGS. 5–11.
Figure 68:
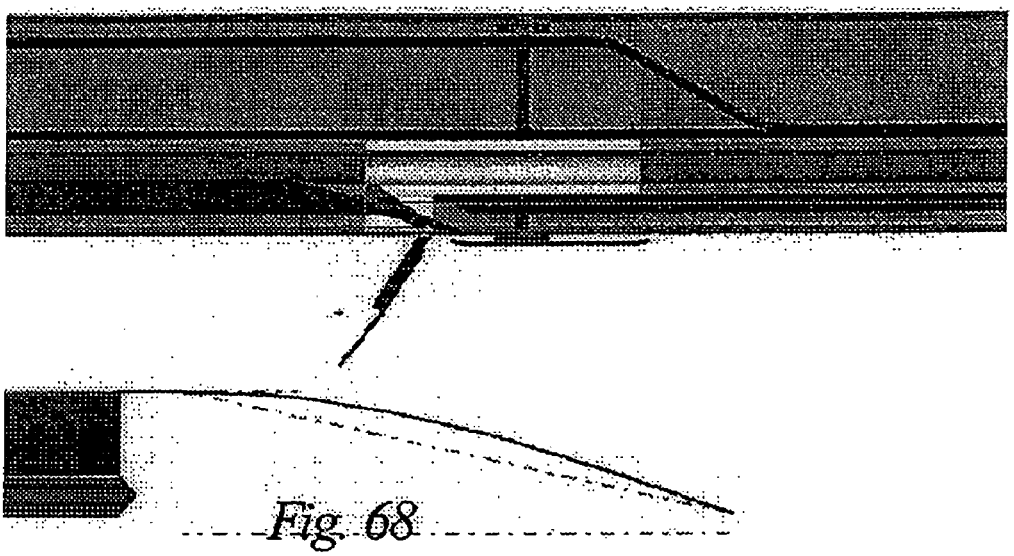
FIG. 68 is an illustration of a subsequent step in the operation of the apparatus shown in FIGS. 5–11.
Figure 69:
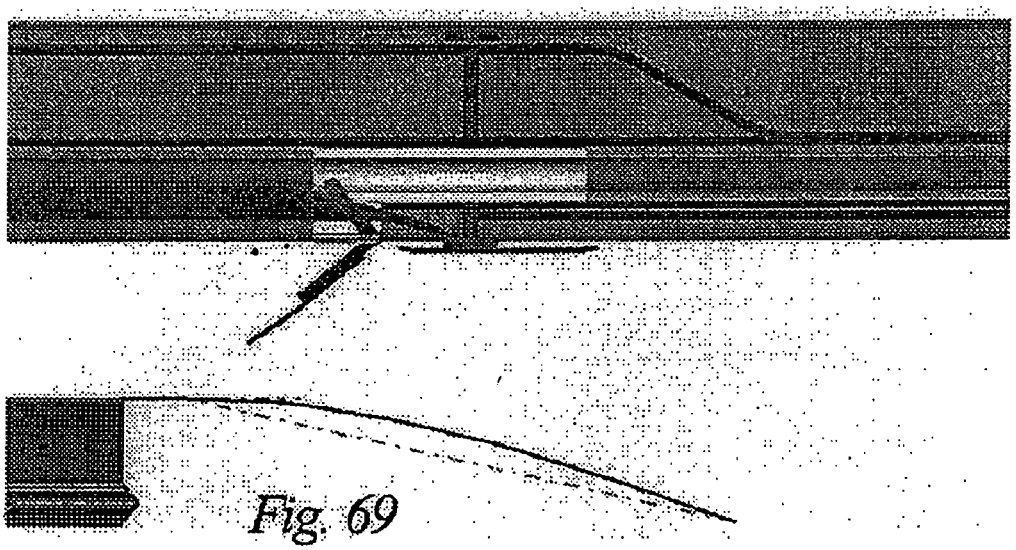
FIG. 69 is an illustration of a subsequent step in the operation of the apparatus shown in FIGS. 5–11.
Figure 75:
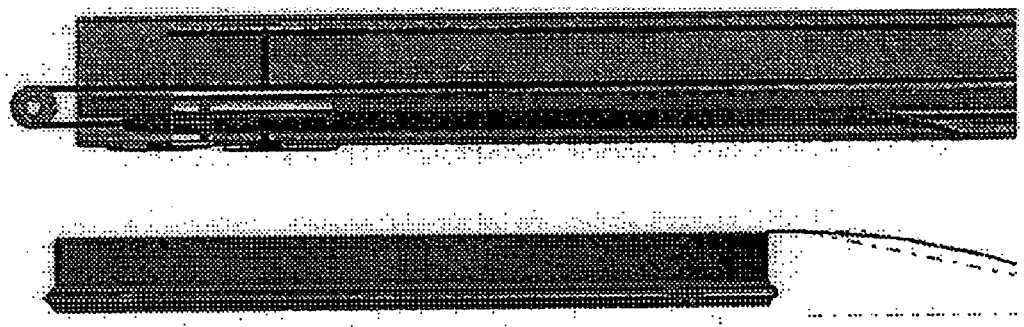
FIG. 75 is an illustration of a subsequent step in the operation of the apparatus shown in FIGS. 5–11.
Figure 76:
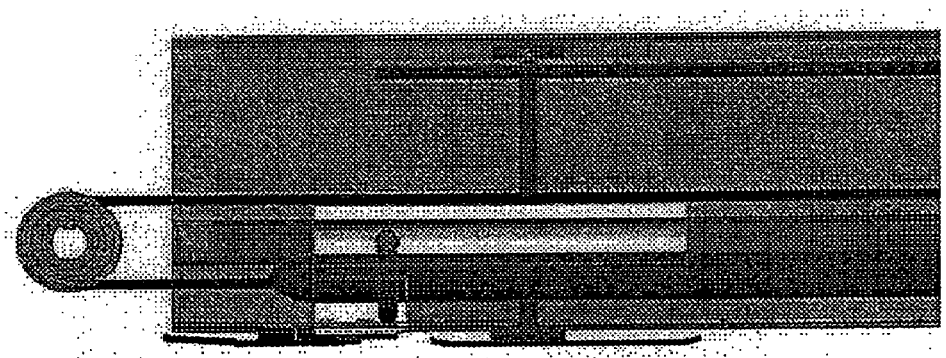
FIG. 76 is an illustration of a subsequent step in the operation of the apparatus shown in FIGS. 5–11.
Figure 77:
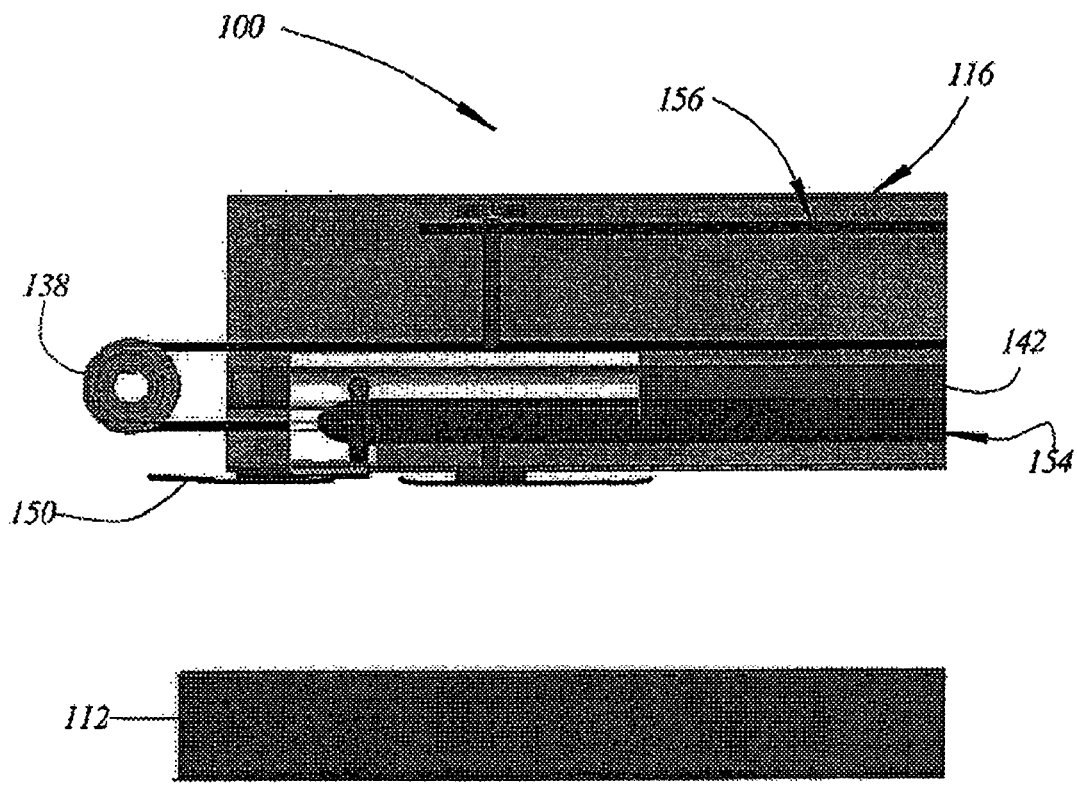
FIG. 77 is an illustration of a subsequent step in the operation of the apparatus shown in FIGS. 5–11.
Figure 78:
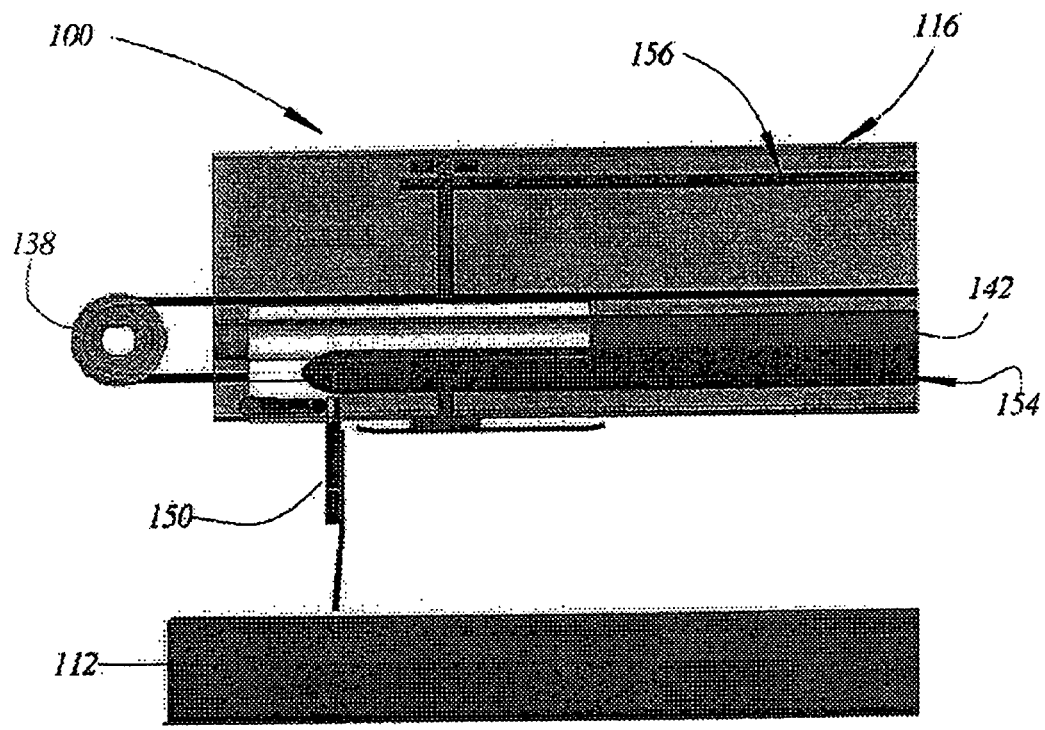
FIG. 78 is an illustration of a subsequent step in the operation of the apparatus shown in FIGS. 5–11.
Figure 79:
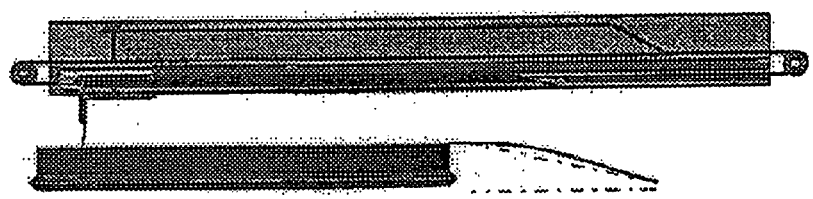
FIG. 79 is an illustration of a subsequent step in the operation of the apparatus shown in FIGS. 5–11.
Figure 80:
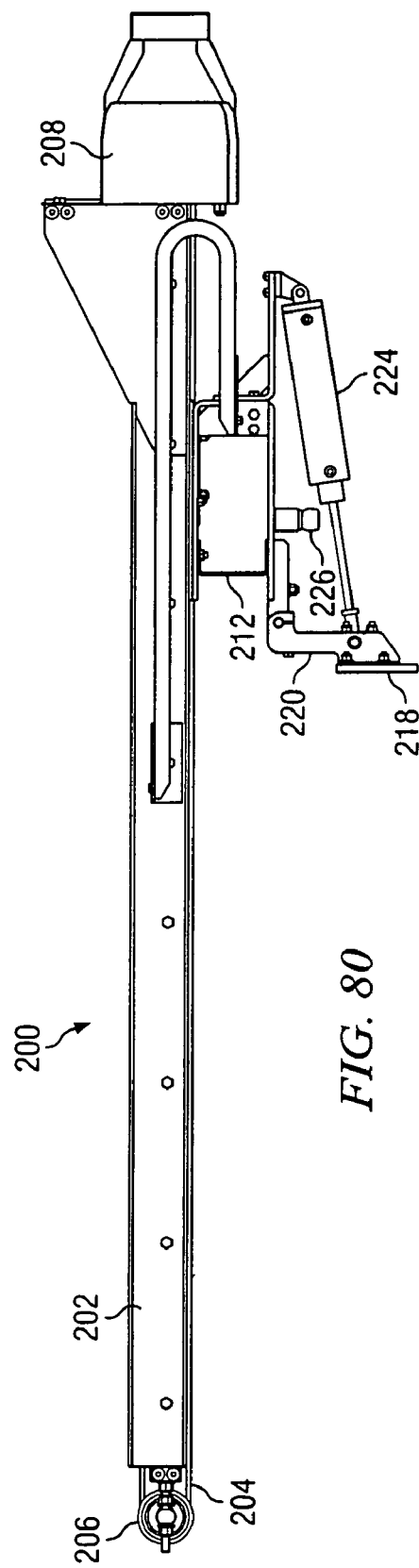
FIG. 80 is a side view of a transfer apparatus useful for moving bakery products onto the vacuum turntable of the present invention in lieu of the transfer apparatus 110 shown in FIGS. 1–3, inclusive, and described hereinabove in conjunction therewith.
Figure 81:
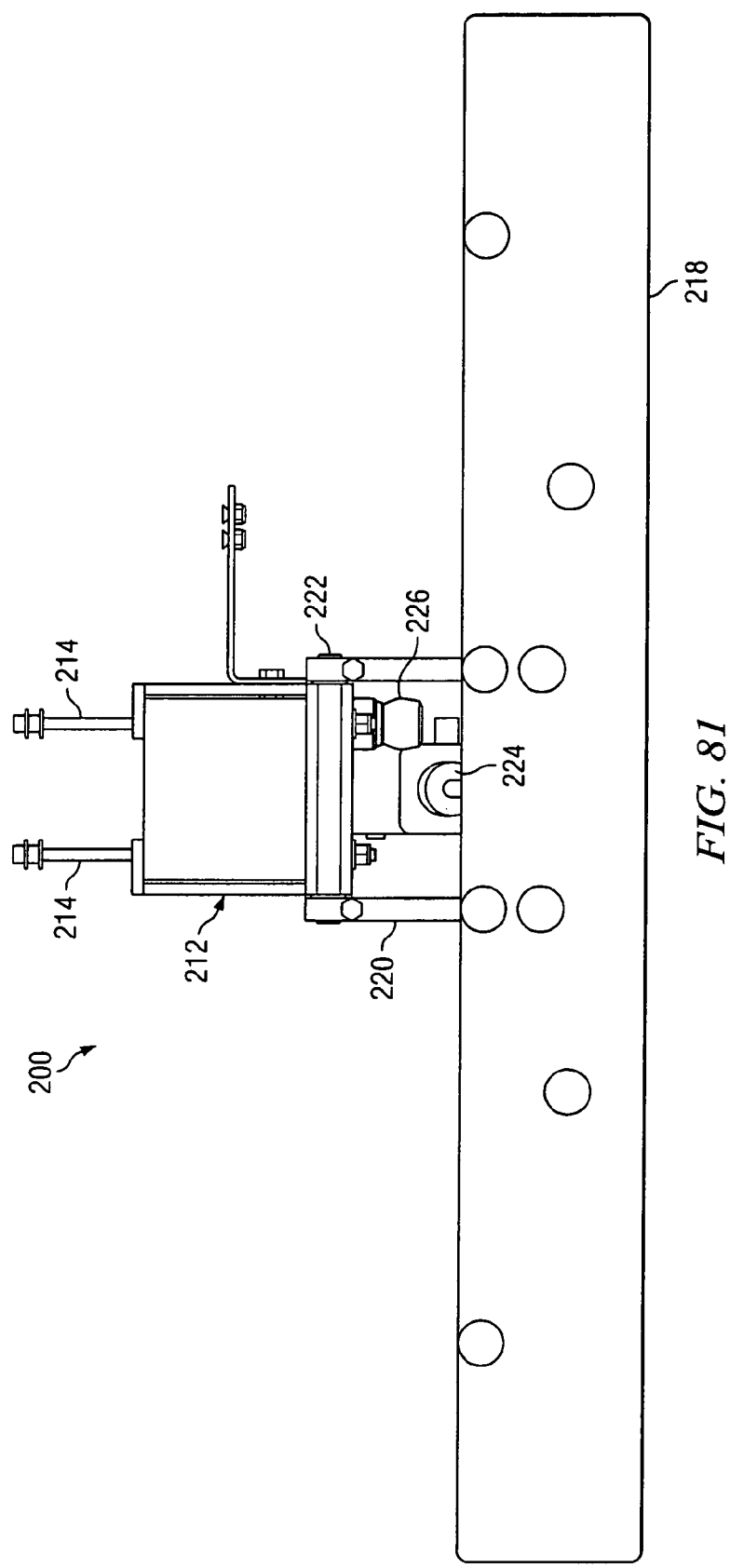
FIG. 81 is a partial end view of the transfer apparatus of FIG. 80.
Figure 82:
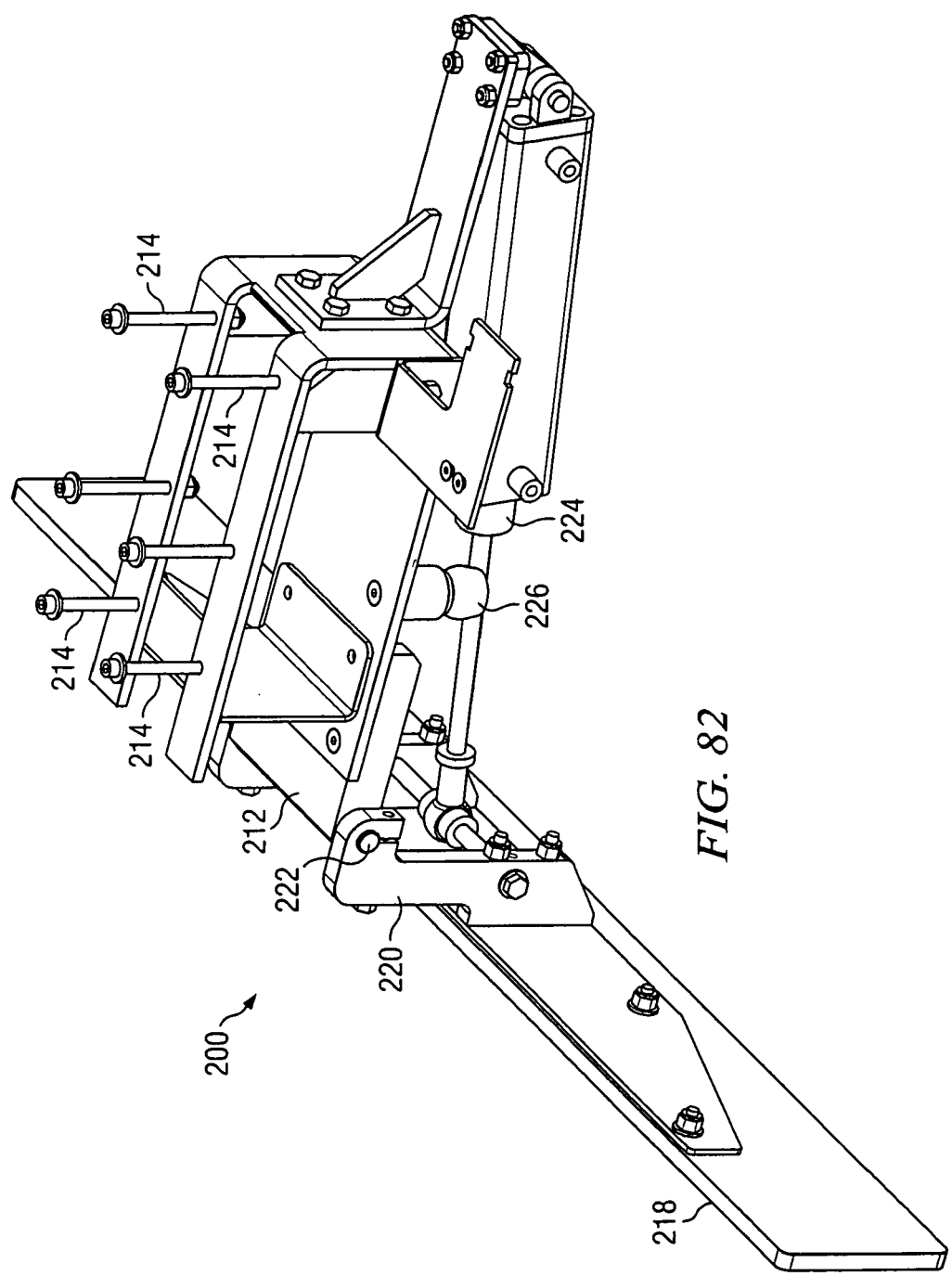
FIG. 82 is a partial rear perspective view of the transfer apparatus of FIG. 80.

The operation of the transfer apparatus 116 of the pattern former 100 is illustrated in FIGS. 12–79, inclusive. A plurality of wrapped bakery products P are positioned on the vacuum turntable 112. A bakery tray T is positioned to receive the wrapped bakery products P. A slip sheet 180 extends from the vacuum turntable 112 into the bakery tray T. The pusher plate 150 extends downwardly and engages the wrapped bakery products P. Under the action of the motor 140 operating through the belt 136, the pusher plate 150 begins to push the wrapped bakery products P toward the bakery tray T.

FIGS. 12–42, inclusive, depict the movement of the wrapped bakery products P away from the vacuum turntable 112 and into the bakery tray T under the action of the pusher plate 150. As will be appreciated by those skilled in the art, the wrapped bakery products P follow a sliding movement downwardly along the upper surface of the slip sheet 180 as the wrapped bakery products P enter the bakery tray T.

Referring particularly to FIGS. 43–53, the movement of the wrapped bakery products P into the bakery tray T under the action of the pusher plate 150 eventually causes the bakery tray T to move away from the vacuum turntable 112 thereby disengaging the slip sheet 180 therefrom. FIGS. 48–53 illustrate the pivotally supported section 166 of the pusher plate cam 154 pivoting upwardly to allow the cam followers 164 to pass thereunder.

FIGS. 53–63, inclusive, illustrate the final portion of the movement of the wrapped bakery products P into the bakery tray T. The cam followers 176 eventually reach the end of the flat portions of the spanker plate cams 156 whereupon the spanker plate 152 is allowed to move downwardly. As will be appreciated by those skilled in the art, the spanker plate 152 is not forced downwardly, but instead m oves downwardly under the action of gravity. The function of the spanker plate 152 is to assure that the last wrapped bakery product P comprising the pattern that was formed on the vacuum turntable 112 is fully seated in the bakery tray T. Simultaneously, the slip sheet 180 is fully disengaged from the bakery tray T as the bakery tray T moves away from the vacuum turntable 112 under the action of the pusher plate 150.

FIGS. 64–79, inclusive, illustrate the return movement of the traveler 142 and the apparatus carried thereby, that is, the movement of the traveler 142 away from the motor 140 and toward the vacuum turntable 112. As the cam followers 176 move into engagement with the inclined portion of the spanker plate cams 156, the spanker plate 152 is moved upwardly. As the cam followers 164 engage the pivotally supported sections 166 of the pusher plate cams 154, the pusher plate 150 is pivoted upwardly until it extends parallel to the belt 136.

Upward movement of the spanker plate 152 and upward pivotal movement of the pusher plate 150 allow the pusher plate 150 and the spanker plate 152 to pass over a subsequent pattern of wrapped bakery products that was formed on the vacuum turntable 112 as the pusher plate was moving the previously formed pattern of wrapped bakery products into the bakery tray T. The fact that a pattern of wrapped bakery products can be moved into a bakery tray and a subsequent pattern of wrapped bakery products can simultaneously be formed on the vacuum turntable 112 comprises an important feature of the present invention which substantially increases the throughput rate of pattern formers incorporated in the invention.

Referring particularly to FIGS. 76–79, inclusive, when the cam followers 164 reach the ends of the upper surfaces of the pusher plates cams 154, the pusher plate 150 drops down under the action of gravity and returns to its original positioning. The spanker plate 152 remains in its raised orientation under the action of the engagement of the cam followers 176 with the spanker plate cams 156. FIG. 79 illustrates the component parts of the apparatus 116 in their original orientation and ready to move a subsequent pattern of wrapped bakery products into a bakery tray.

The transfer apparatus 110 which moves groups of wrapped bakery products from the grouping apparatus 108 to the vacuum turntable 112 operates exactly the same as the transfer apparatus 116, the only difference being that the transfer apparatus 110 does not include a spanker plate. The transfer apparatus 110 includes a pusher plate 182 which is mounted on a belt driven traveler constructed similarly to and functioning identically to the traveler 142 and which is activated by cams constructed similarly to and functioning identically to the pusher plate cams 154. Thus, the apparatus 110 operates identically to the operation of the pusher plate 150 of the transfer apparatus 116 in that it is positioned in a downwardly extending, operative orientation as it moves groups of bakery products from the grouping apparatus 108 to the vacuum turntable 112, and is cammed upwardly into a horizontally disposed orientation as it moves in the reverse direction, that is, away from the vacuum turntable 112 and back toward the grouping apparatus 108. In this manner the pattern former of the present invention functions to arrange a subsequent group of wrapped bakery products on the grouping apparatus 108 as the pusher plate 182 is moving a previous group of wrapped bakery products onto the vacuum turntable 112. The fact that the two operations occur simultaneously comprises an important feature of the pattern former 100 which substantially increases the throughput rate thereof.

Figure 2:
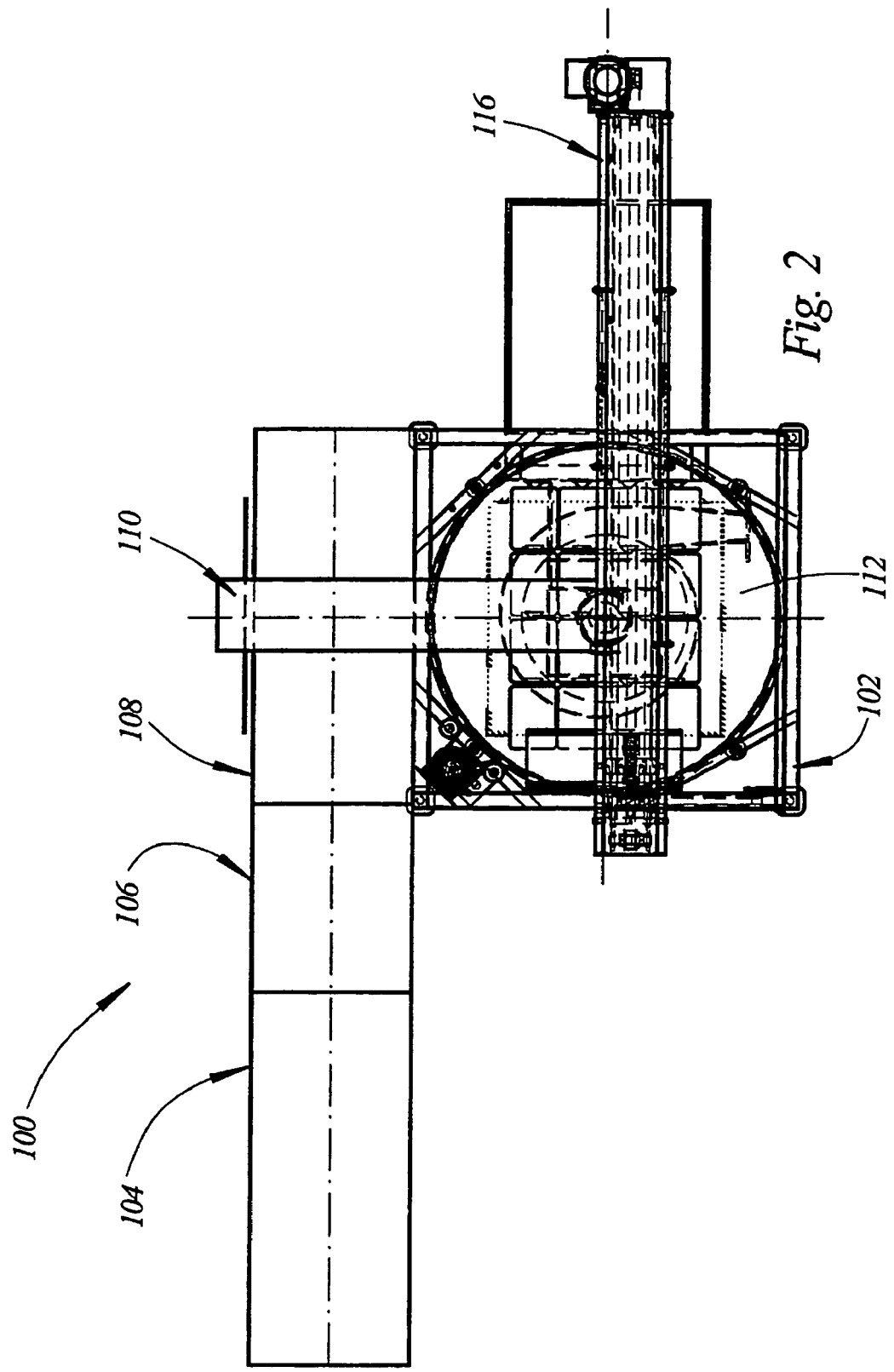
FIG. 2 is a top view of the pattern former of FIG. 1.

Referring to FIGS. 80, 81, 82, 83, and 83A, there is shown a transfer apparatus 200 which may be used in the pattern former 100 in lieu of the transfer apparatus 110 shown in FIGS. 1, 2, and 3 and described hereinabove in conjunction therewith. The transfer apparatus 200 includes a support frame 202 which defines the course of a drive cable 204. The drive cable 204 is trained around a pulley 206 mounted at one end of the support frame 202 and is actuated by a drive mechanism 208 mounted at the opposite end of the support frame 202. The transfer apparatus 200 further includes a carriage which supports a subframe 212 for movement back and forth between locations adjacent the opposite ends of the support frame 202.

Figure 83:
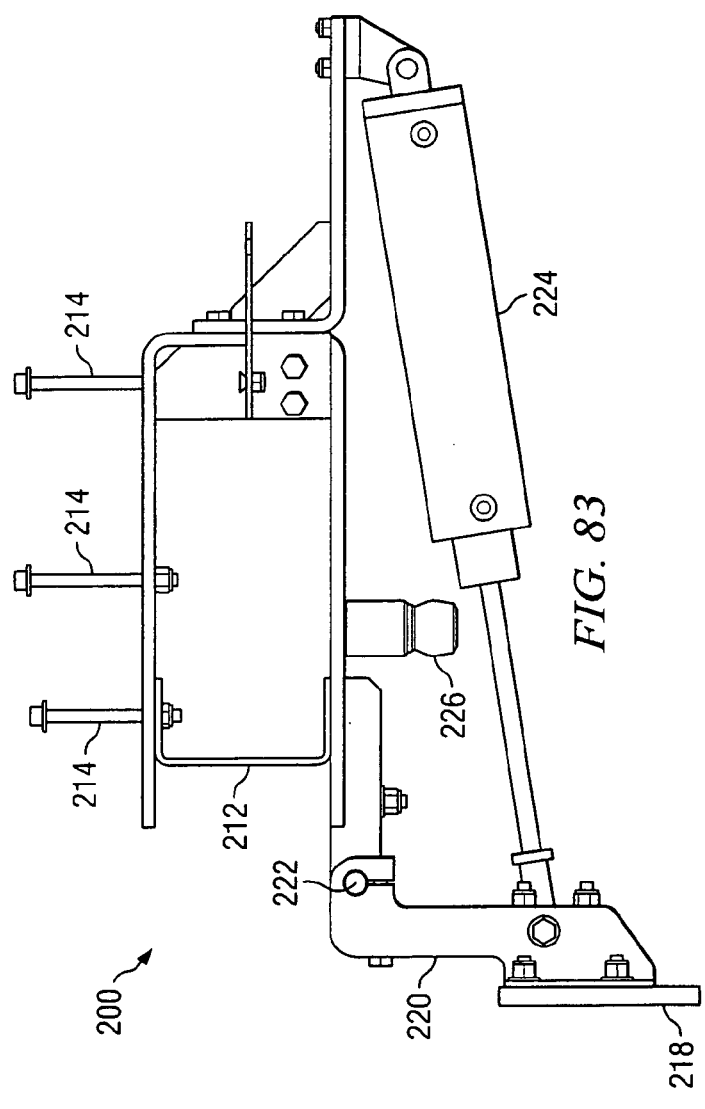
FIG. 83 is an enlargement of a portion of FIG. 80.
Figure 84:
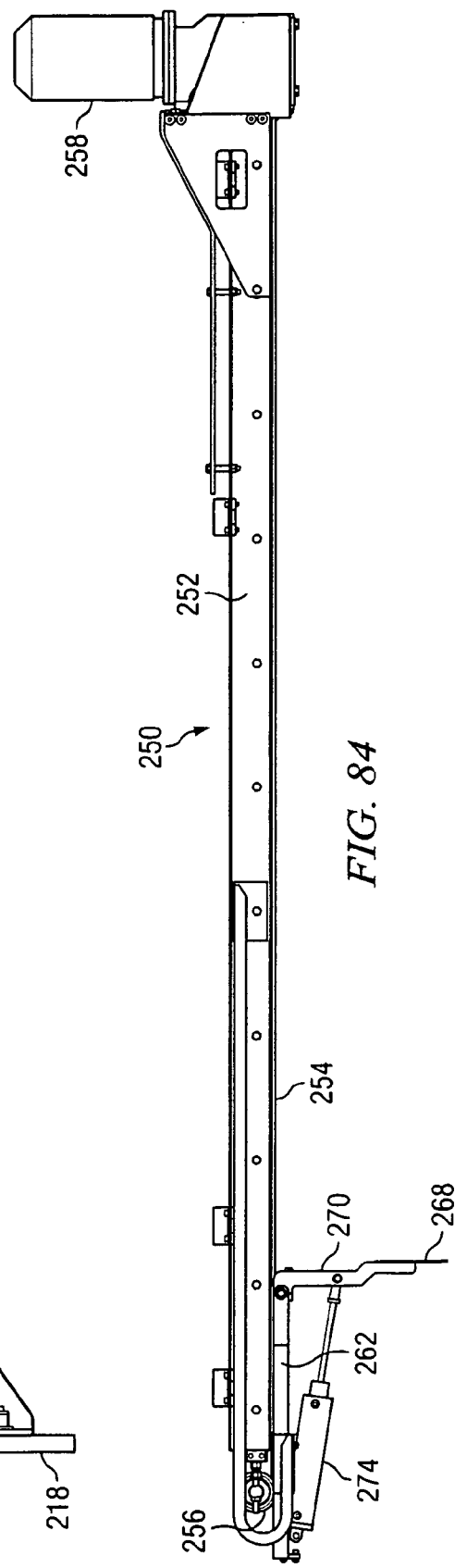
FIG. 84 is a side view of a transfer apparatus which may be used in lieu of the transfer apparatus 116 shown in FIGS. 1–79, inclusive, and described hereinabove in conjunction therewith.
Figure 83A:
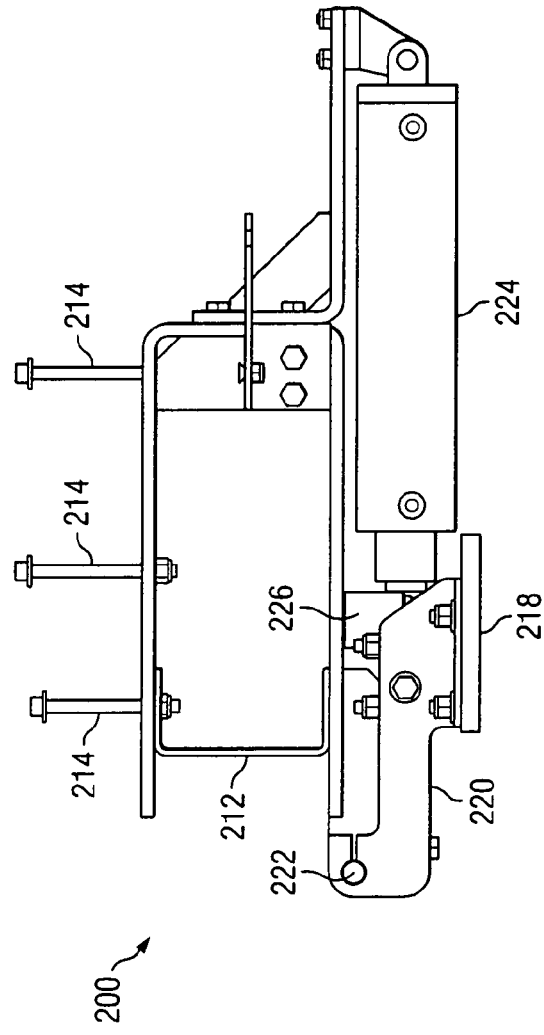
FIG. 83A is a view similar to FIG. 83 showing the apparatus thereof in a subsequent state of its operation.

Referring to FIGS. 83 and 83A, the subframe 212 is supported on the carriage of the transfer apparatus 200 by a plurality of threaded fasteners 214. A pusher plate 218 is supported by a bracket 220 which is in turn pivotedly supported on the subframe 212 by an axle 222. A fluid powered cylinder 224 is connected between the subframe 212 and the bracket 220. The function of the fluid powered cylinder 224, which may be either hydraulically or pneumatically actuated, is to pivot the pusher plate 218 between the position illustrated in FIG. 83 and the position illustrated in FIG. 83A. Pivotal movement of the pusher plate 218 away from the position illustrated in FIG. 83 and toward the position illustrated in FIG. 83A is limited by a stop 226.

Pivotal movement of the pusher plate 218 between the position illustrated in FIG. 83 and the position illustrated in FIG. 83A comprises an important feature of the invention. Thus, the pusher plate 218 is positioned as illustrated in FIG. 83 during utilization thereof to move bakery products from the grouping apparatus 108 onto the vacuum turntable 112. After the bakery products have been delivered onto the vacuum turntable 112, the fluid powered cylinder 224 is actuated to pivot the pusher plate 218 into the position illustrated in FIG. 83A. This allows the pusher plate 218 to move past a subsequent group of bakery products being formed on the grouping apparatus 108 during return movement of the subframe 212 to its original position.

Referring to FIGS. 84, 85, 85A, 86, and 87 there is shown a transfer apparatus 250 which may be utilized in the pattern former 100 in lieu of the transfer apparatus 116 as illustrated in FIGS. 1–79, inclusive, and described hereinabove in conjunction therewith. The transfer apparatus 250 includes a support frame 252. The support frame 252 defines the course of a drive belt 254 which is trained around a pulley 256 located at one end of support frame 252. The belt 254 is driven by a drive mechanism 258 mounted at the opposite end of the support frame 252.

A carriage is mounted on the support frame 252 for movement there along under the action of the belt 254. A subframe 262 is mounted on the carriage for movement thereby back and forth between positions located adjacent the opposite ends of the support frame 252.

Figure 85A:
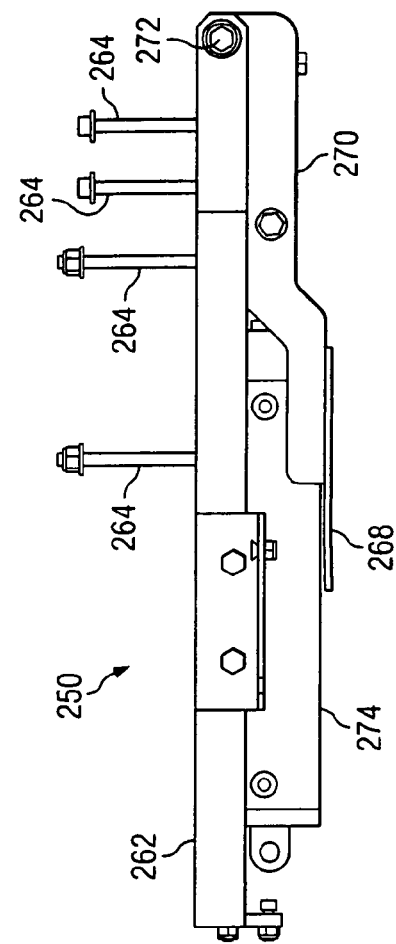
FIG. 85A is a view similar to FIG. 83 showing the apparatus thereof in a subsequent state of its operation.
Figure 85:
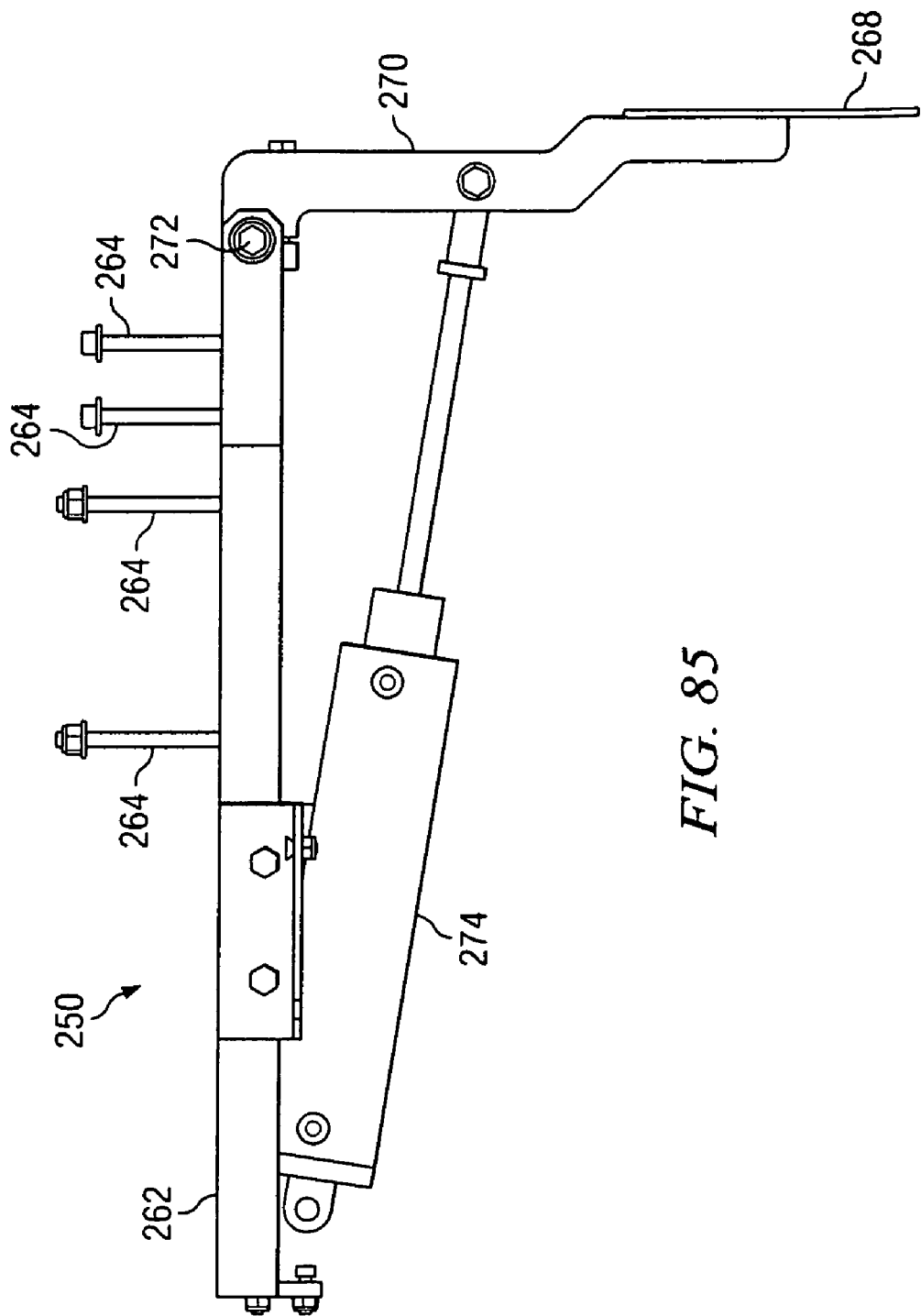
FIG. 85 is an enlargement of a portion of FIG. 84.
Figure 86:
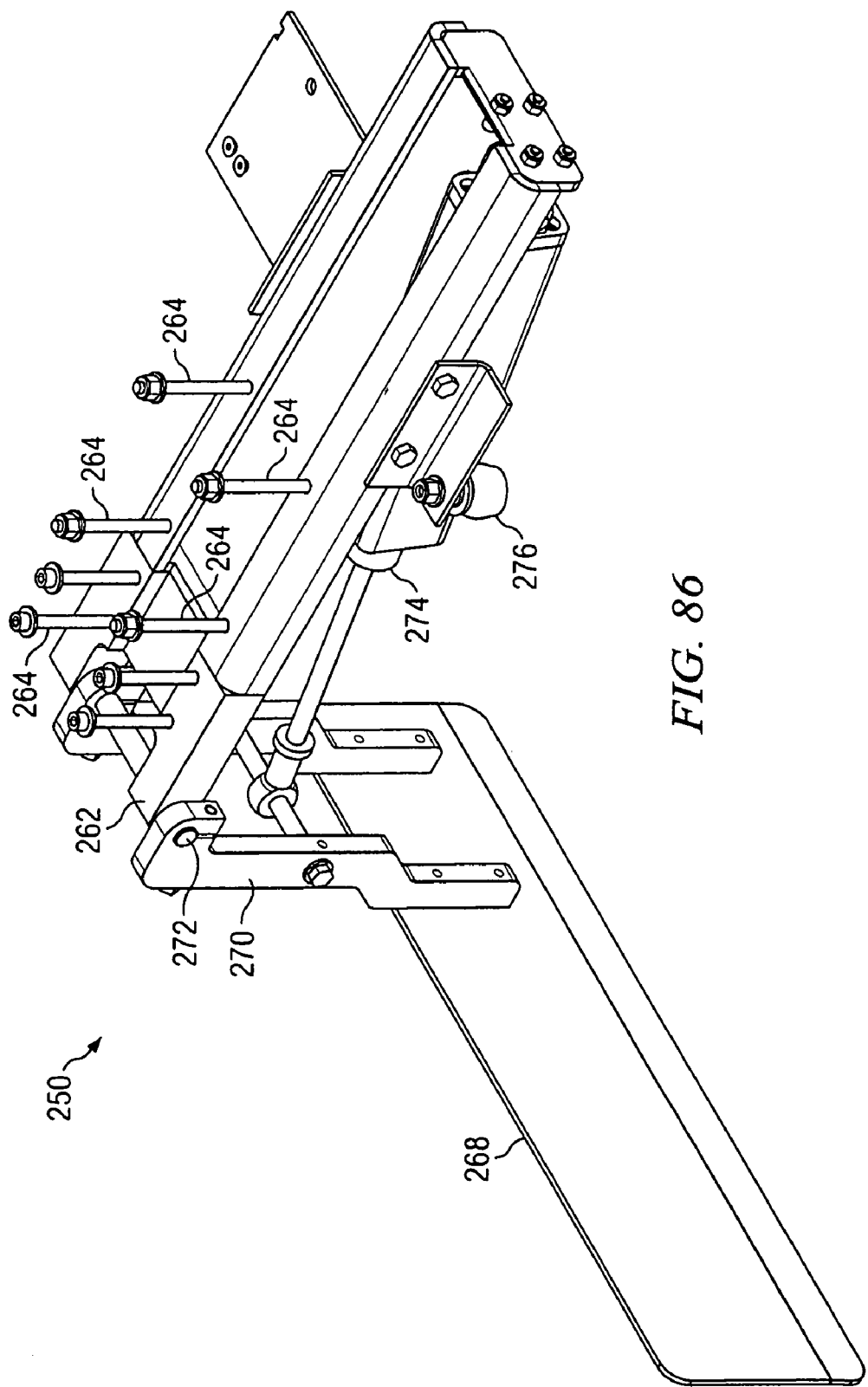
FIG. 86 is a partial rear perspective view of a portion of the apparatus of FIG. 84.
Figure 87:
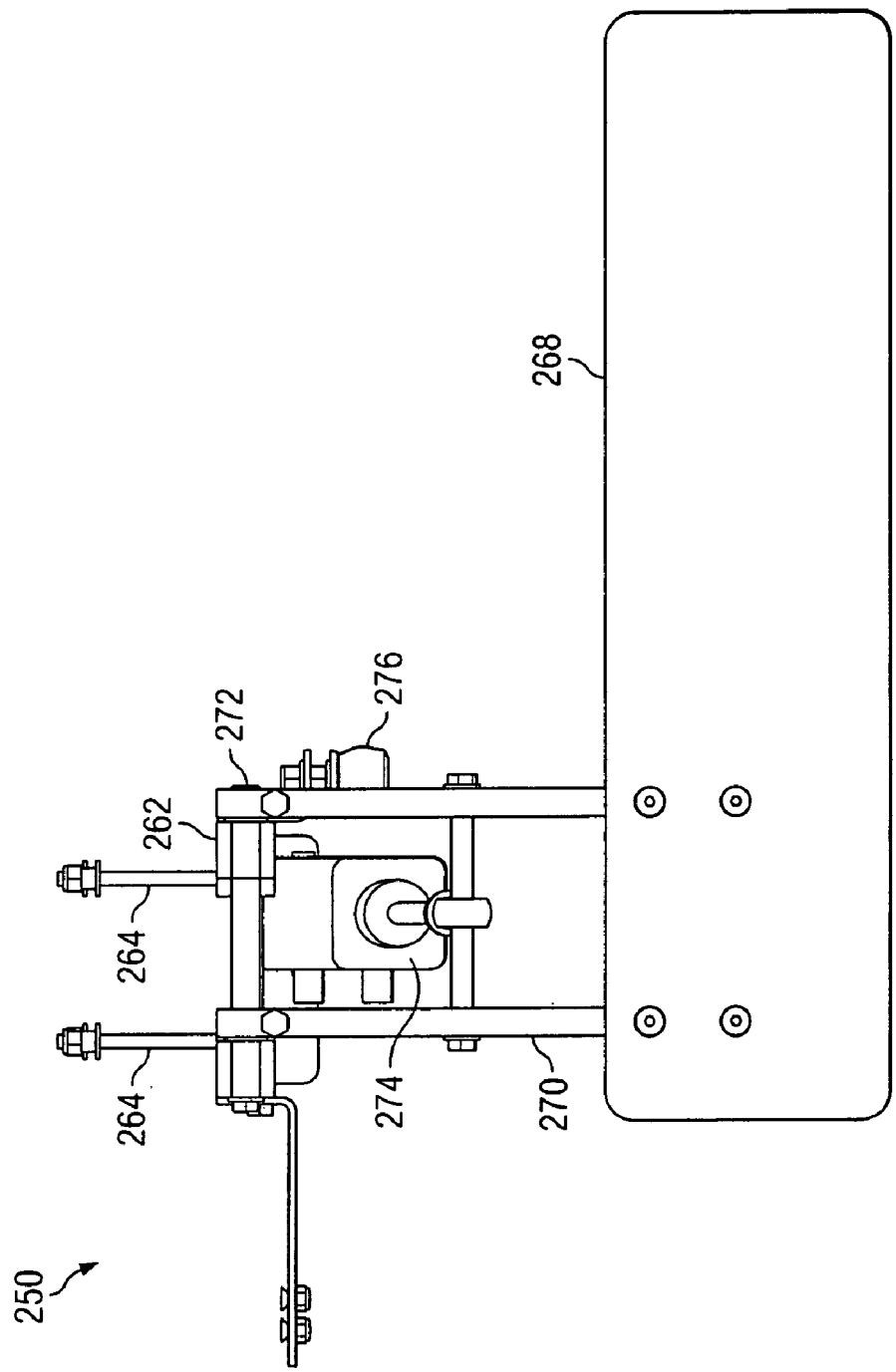
FIG. 87 is a partial end view of the transfer apparatus of FIG. 84.
Figure 88:
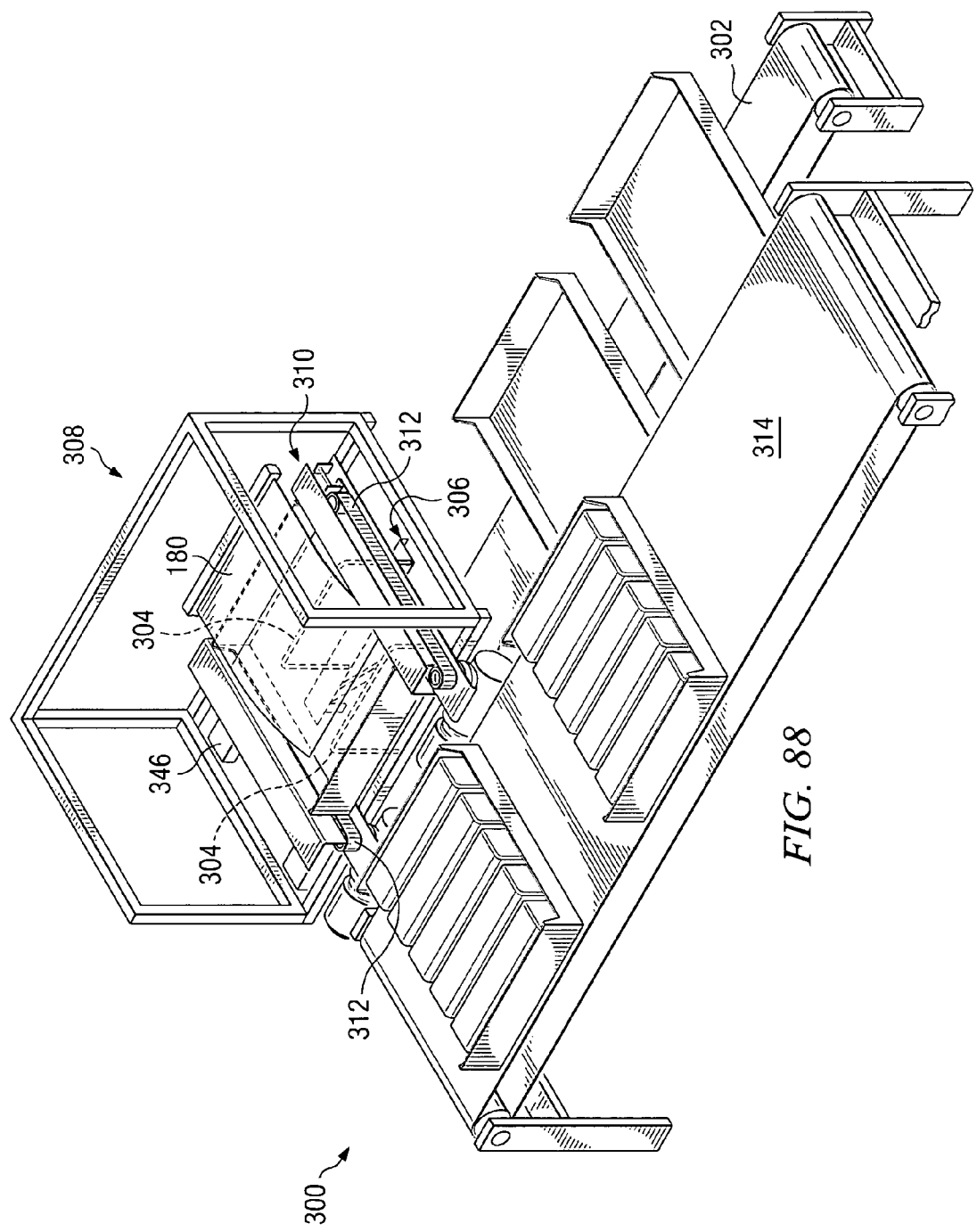
FIG. 88 is a perspective view of a bakery tray loading system which may be used in conjunction with the pattern former and apparatus for filling bakery trays illustrated in FIGS. 1 through 87.

Referring to FIGS. 85 and 85A, the subframe is supported on the carriage by a plurality of threaded fasteners 264. A pusher plate 268 is mounted on a bracket 270 for pivotal movement about an axis defined by an axle 272. A fluid powered cylinder 274 is supported between the subframe 262 and the bracket 270. The function of a fluid powered cylinder 274, which may be activated either hydraulically or pneumatically, is to pivot the pusher plate 268 back and forth between the position illustrated in FIG. 85 in the position illustrated in FIG. 85A. As is best shown in FIGS. 86 and 87, pivotal movement of the pusher plate 268 toward the position illustrated in FIG. 85A is limited by a stop 276.

The pivotal movement of the pusher plate 268 between the positions illustrated in FIG. 85 and the position illustrated in FIG. 85A comprises an important feature of the invention. Thus, the pusher plate 268 is positioned as illustrated in FIG. 85 to effect transfer of patterns of bakery products from the vacuum turntable 112 into bakery trays or bakery baskets. The pusher plate 268 is positioned as illustrated in FIG. 85A during return movement thereof to its original positioning. This allows a subsequent pattern of bakery products to be accumulated on the vacuum turntable 112 during the transfer of a previous pattern of bakery products into a bakery tray or a bakery basket.

FIGS. 88 through 92 illustrate a bakery tray loading system 300 that may be used in conjunction with the pattern former 100 and transfer apparatus 110 for filling bakery trays illustrated in FIGS. 1 through 87, inclusive, and described hereinabove in conjunction therewith. The bakery tray loading system 300 comprises an in-feed conveyor 302 for sequentially delivering unfilled bakery trays to be loaded with wrapped bakery products. Positioned around the in-feed delivery conveyor 302 at a predetermined stopping point below the pattern former 100 are support members 304 which receive an unfilled bakery tray thereon. The support members 304 and the unfilled bakery tray supported thereby are raised by a scissor lift 306 into a bakery tray loading station 308. Once the bakery tray is positioned in the bakery tray loading station 308 at a height substantially adjacent to the vacuum turntable 112, the bakery tray T is received and supported by a tray positioning conveyor 310 and the support members 304 are thereafter lowered to a position surrounding the delivery conveyor 302 to receive a next unfilled bakery tray. The patterned wrapped bakery products are then loaded onto the bakery tray T via the slip sheet 180. Once all of the bakery products are received onto the tray T, belts 312 located near the bottom of the tray positioning conveyor 310 propel the tray T away from the vacuum turntable 112 onto an out-feed conveyor 314 to convey the loaded bakery tray T for further processing.

Figure 89:
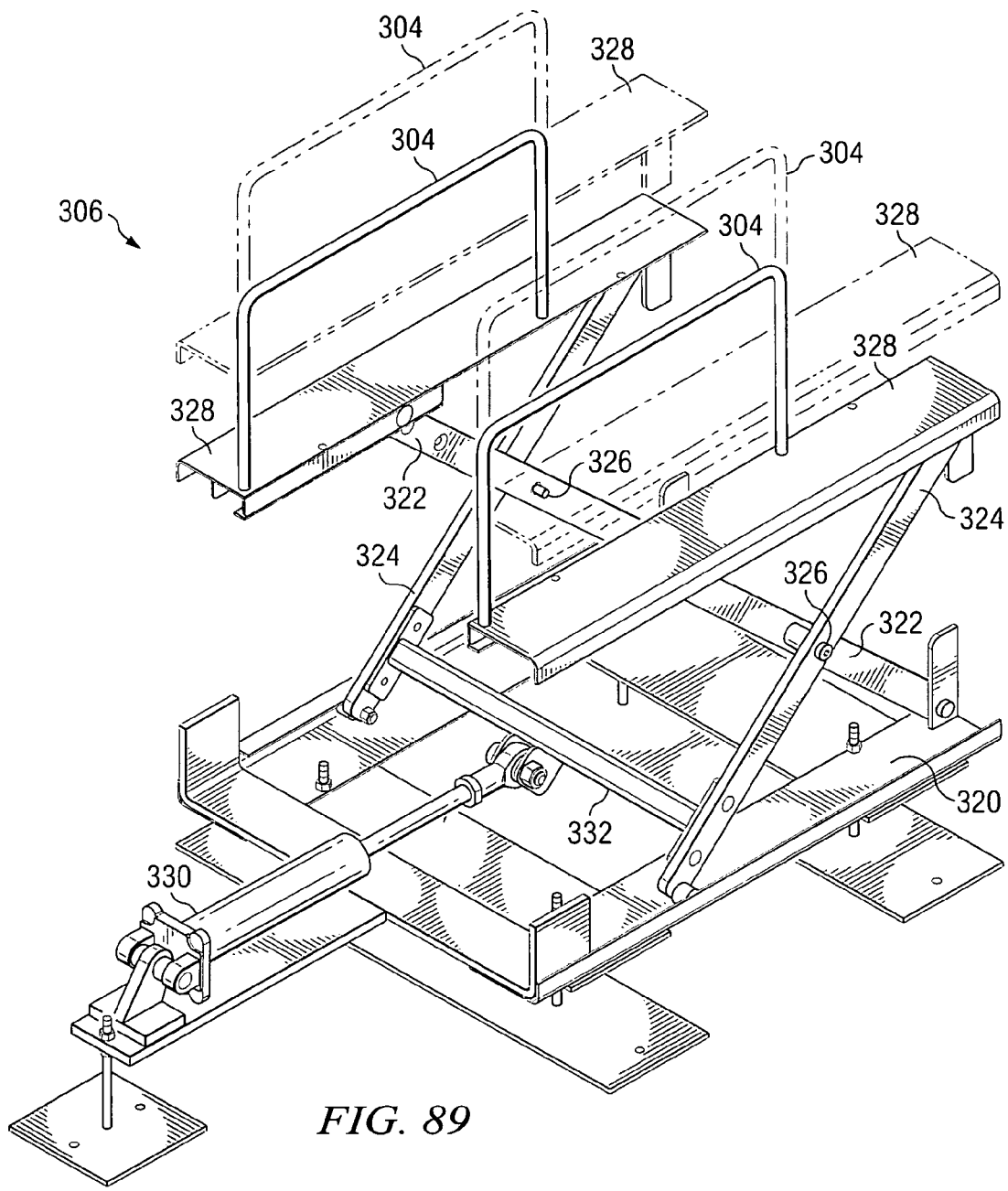
FIG. 89 is a perspective view of one of the components of the bakery tray loading system of FIG. 88.

FIG. 89 illustrates the scissor lift 306. A base 318 supports a lower bracket 320 having inner legs 322 and outer legs 324 mounted thereon. The inner legs 322 are pivotally secured at one end of the lower bracket 320. The outer legs 324 are pivotally mounted to the inner legs 322 by fastening devices 326 such as bolts or any other suitable means known to those skilled in the art of manufacturing industrial lifting equipment. The outer legs 324 are not secured directly to the lower bracket 320 but instead are slidably supported on the bracket 320 for movement along a horizontal axis thereon. The legs 322 and 324 are similarly mounted on upper brackets 328 having the support members 304 mounted thereon. A hydraulic cylinder 330 pushes a tie bar 332, secured between the outer legs 324, raising the legs 322 and 324 thereby lifting the support members 304. As an alternative to the hydraulic cylinder the tie bar 332 may be pushed and retracted by various other suitable means known to those skilled in the art of manufacturing industrial lifting equipment.

Figure 90:
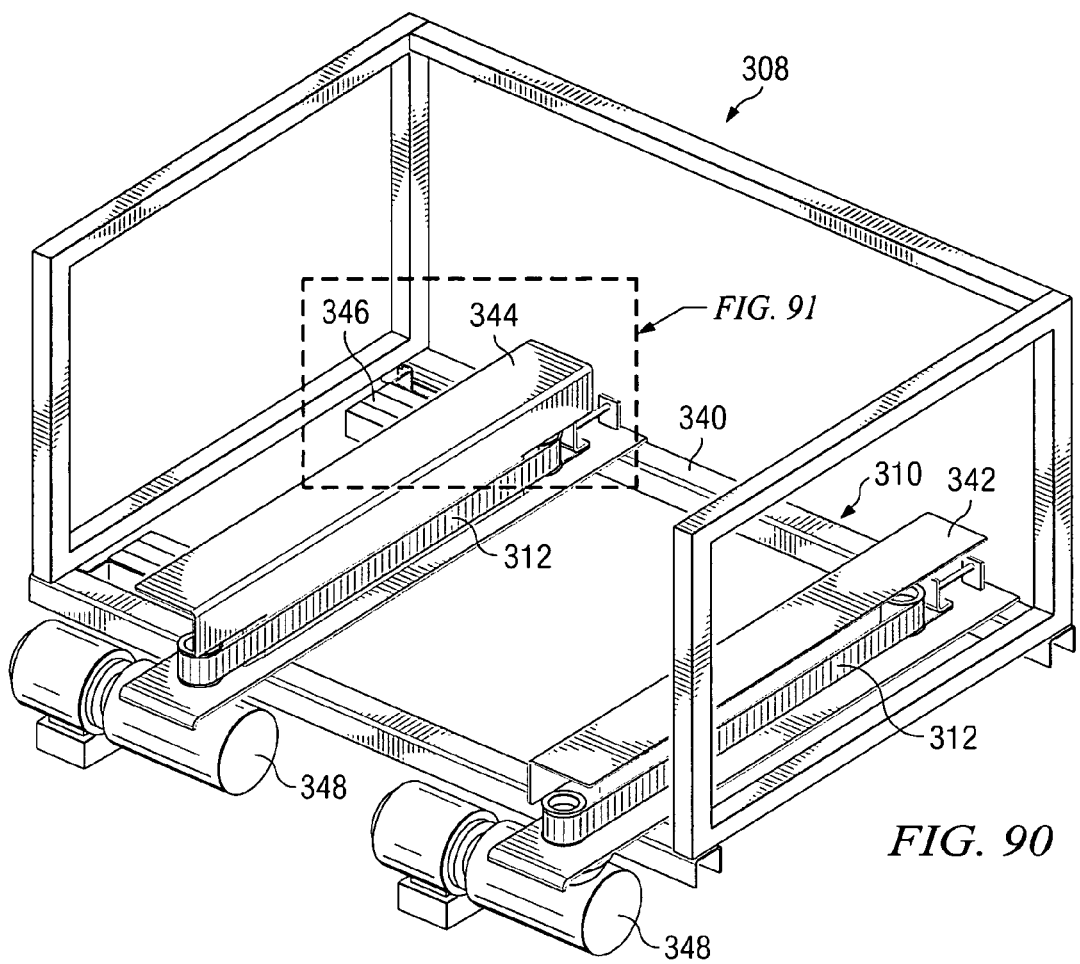
FIG. 90 is a perspective view of another component of the bakery tray loading system of FIG. 88.

FIG. 90 illustrates the bakery tray loading station 308. The tray positioning conveyor 310 comprises a frame 340 having a stationary side rail 342 and a positioning side rail 344 mounted on each side thereof. The positioning side rail 344 is slidably mounted within the frame for movement therein along a horizontal axis perpendicular to the stationary side rail 342. The positioning side rail 344 is propelled by a hydraulic cylinder 346 secured therebelow. The positioning side rail 344 may also be powered by a belt and motor system or other suitable means known to those skilled in the art of manufacturing conveyors.

As an unfilled tray is being lifted into the loading station 308 the positioning side rail 344 is moved away from the stationary side rail 342 thereby allowing an unfilled tray to enter the loading station 308. Once the unfilled tray is substantially adjacent to the vacuum turntable 112 at a height suitable for receiving wrapped bakery products, the positioning side rail 344 is moved inwardly to engage the unfilled bakery tray T and thereafter continues moving inwardly pushing the unfilled bakery tray T into supportive engagement with the stationary side rail 342. The belts 312 located near the bottom of each side rail 342 and 344 are thereafter utilized as needed to further position the unfilled tray T to receive wrapped bakery products from the vacuum turntable 112. The belts 312 are driven by motors 348 located beneath the side rails 342 and 344.

Figure 91:
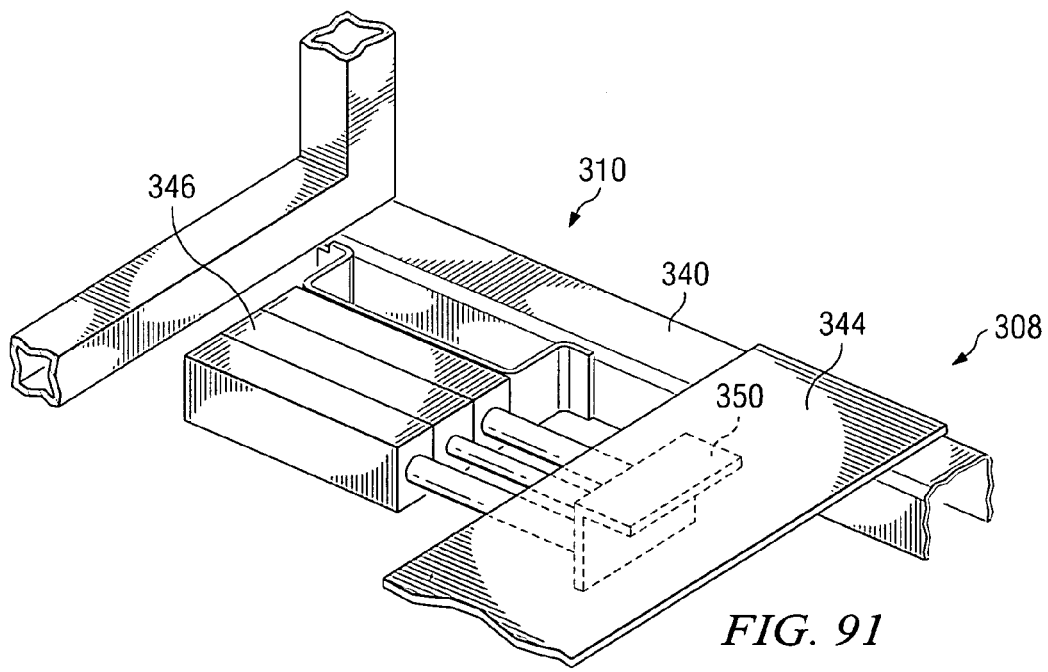
FIG. 91 is a perspective view of a component used in the operation of the component shown in FIG. 90.

FIG. 91 shows the hydraulic cylinder 346 and a positioning member 350 used to position the positioning side rail 344.

Figure 92:
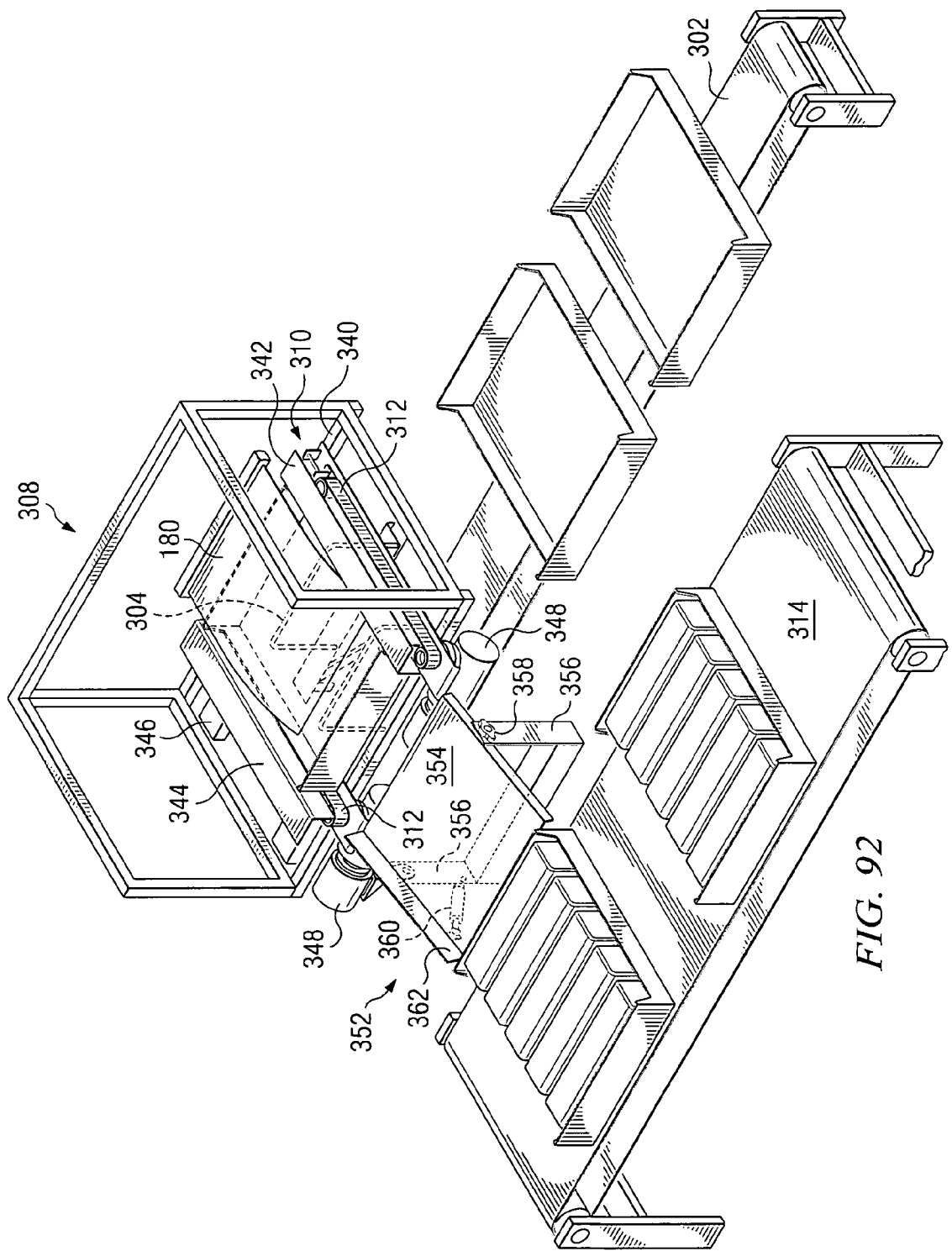
FIG. 92 is view similar to FIG. 88 showing the bakery tray loading system comprising an additional component that may be used in conjunction therewith.

FIG. 92 illustrates a tilt slide assembly 352 used in conjunction with the bakery tray loading station 308 when the out-feed conveyor 314 cannot be positioned at a suitable height or distance relative to the loading station 308 to receive filled bakery trays. The tilt slide assembly 352 comprises a slide plate 354 pivotally supported by adjustable arms 356. The arms 356 secure to the slide plate by fasteners 358 and are adjusted by a cylinder 360 secured between the slide plate 354 and one of the two arms 356. The slide plate 354 comprises a reflector plate 362 fastened on the back thereof for guiding the filled tray T onto the end-feed conveyor 314.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. A bakery tray loading system comprising:
   means defining a bakery tray loading station;
   an in-feed conveyor for receiving unfilled bakery trays and for sequentially delivering unfilled bakery trays to a location adjacent the bakery tray loading station;
   transfer means for sequentially receiving unfilled bakery trays from the in-feed conveyor and for delivering each unfilled bakery tray to the bakery tray loading station;
   a bakery tray positioning conveyor for sequentially receiving unfilled bakery trays from the transfer means and for positioning each received bakery tray within the bakery tray loading station;
   means for loading wrapped bakery products into bakery trays located in the bakery tray loading station by the bakery tray positioning conveyor;
   an out-feed conveyor for receiving bakery trays loaded with wrapped bakery products;
   the bakery tray positioning conveyor for delivering loaded bakery trays from the bakery tray loading station to the out-feed conveyor.

2. The bakery tray loading system according to claim 1 wherein the transfer means for sequentially receiving unfilled bakery trays from the in-feed conveyor and for delivering each unfilled bakery tray to the bakery tray loading station is a scissor lift having two support members mounted thereon for receiving and supporting an unfilled bakery tray until the unfilled bakery tray is received within the bakery tray loading station.

3. The bakery tray loading system according to claim 1 wherein the means for loading wrapped bakery products into bakery trays received within the bakery tray loading station is a slip sheet extending from a vacuum turntable and a pusher plate for moving patterns of wrapped bakery products from the vacuum turntable along the slip sheet and into bakery trays.

4. The bakery tray loading system according to claim 1 wherein the means for loading wrapped bakery products into bakery trays received within the bakery tray loading station is a transfer apparatus for moving patterns of wrapped bakery products from an adjacent vacuum turntable into bakery trays comprising:
   a pusher plate for moving patterns of wrapped bakery products from the turntable into bakery trays; and
   fluid powered cylinder means for positioning the pusher plate in a vertical orientation during movement of patterns of wrapped bakery products into bakery trays under the action of the pusher plate and for pivoting the pusher plate into a horizontal orientation during return movement thereof.

5. The bakery tray loading system according to claim 1 further comprising means for transferring loaded bakery trays between the bakery tray positioning conveyor and the out-feed conveyor.

6. The bakery tray loading system according to claim 5 wherein the means for transferring loaded bakery trays between the bakery tray positioning conveyor and the out-feed conveyor is a tilt-slide apparatus comprising:
   adjustable arms;
   a slide plate for conveying loaded bakery trays thereon;
   the slide plate pivotally supported by the adjustable arms; and
   a reflector plate mounted on the slide plate for guiding the loaded bakery trays being conveyed thereon.

7. The bakery tray loading system according to claim 1 wherein the bakery tray positioning conveyor is an apparatus comprising: a frame;
   a stationary side rail mounted on one side of the frame;
   a positioning side rail slidably mounted within the frame for horizontal movement along a horizontal axis therein;
   means for moving the positioning side rail toward and away from the stationary side rail;
   means for moving the positioning side rail away from the stationary side rail as an unfilled bakery tray enters the bakery tray loading station and thereafter moving toward the stationary side until the bakery tray is supportably engaged by both side rails;
   the stationary side rail and positioning side rail comprising conveyor belts for positioning a bakery tray within the bakery tray loading station; and
   means for driving the conveyor belts.

8. A method of loading bakery trays with wrapped bakery products comprising the steps of:
   providing a bakery tray loading station;
   providing an in-feed conveyor;
   receiving unfilled bakery trays on the in-feed conveyor;
   sequentially transferring the unfilled bakery trays to the bakery loading station;
   providing a bakery tray positioning conveyor;
   sequentially receiving unfilled bakery trays from the in-feed conveyor on the bakery tray positioning conveyor;
   utilizing the bakery tray positioning conveyor for positioning each received bakery tray within the bakery tray loading station to receive wrapped bakery products;
   loading wrapped bakery products into bakery trays located in the bakery tray loading station;
   providing an out-feed conveyor for conveying the loaded bakery trays for further processing; and
   utilizing the bakery tray positioning conveyor for loading the filled bakery trays onto the out-feed conveyor.

9. For use in conjunction with a pattern former for wrapped bakery products of the type having a vacuum turntable for receiving wrapped bakery products, for assembling the received wrapped bakery products into a predetermined pattern, and conveying the wrapped bakery products onto a bakery tray by a slip sheet, an apparatus for positioning bakery trays for receiving wrapped bakery products from the slip sheet comprising:
   a lifting apparatus for transferring unfilled bakery trays to a location adjacent the vacuum turntable;
   an in-feed conveyor for receiving unfilled bakery trays and for sequentially delivering unfilled bakery trays onto the lifting apparatus;
   the lifting apparatus comprising two support members for supporting the received bakery tray and means for lifting the received bakery tray up to the position adjacent to the vacuum turntable to receive wrapped bakery products from the slip sheet;
   a conveyor assembly adjacent to the vacuum turntable comprising a frame having a first and second side rail mounted thereon for supporting the lifted bakery tray adjacent to the vacuum turntable while wrapped bakery products are loaded thereon by the slip sheet;
   the first side rail being stationary and the second side rail being slidably mounted on the frame for movement about a horizontal axis perpendicular to the first side rail within the frame;
   an out-feed conveyor for conveying the loaded bakery trays for further processing; and
   means for conveying the loaded bakery trays onto the out-feed conveyor.

10. The apparatus according to claim 9 wherein the lifting apparatus is a scissor lift.

11. The apparatus according to claim 9 further comprising a tilt slide assembly for conveying filled bakery trays from the conveyor assembly onto the out-feed conveyor.

* * * * *